(12) United States Patent
Prestwich et al.

(10) Patent No.: US 10,996,328 B2
(45) Date of Patent: *May 4, 2021

(54) ADAPTIVE DISCOVERY AND CORRECTION OF PHASE ALIGNMENT ERRORS IN MONOPULSE ANTENNA SYSTEMS

(71) Applicant: L-3 Communications Corp., New York, NY (US)

(72) Inventors: Sy Prestwich, Salt Lake City, UT (US); Jeffrey B. Bench, Salt Lake City, UT (US); Richard A. McNamee, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,594

(22) Filed: Jan. 22, 2020

(65) Prior Publication Data

US 2020/0166629 A1 May 28, 2020

Related U.S. Application Data

(63) Continuation of application No. 15/420,424, filed on Jan. 31, 2017, now Pat. No. 10,591,591.

(51) Int. Cl.
*G01S 13/68* (2006.01)
*G01S 13/44* (2006.01)

(52) U.S. Cl.
CPC .......... *G01S 13/68* (2013.01); *G01S 13/4454* (2013.01); *G01S 13/4481* (2013.01)

(58) Field of Classification Search
CPC ... G01S 13/68; G01S 13/4454; G01S 13/4481
See application file for complete search history.

(56) References Cited

U.S. PATENT DOCUMENTS

| | | | |
|---|---|---|---|
| 8,896,483 B2 * | 11/2014 | Markin | G01S 3/08 342/149 |
| 2016/0118715 A1 * | 4/2016 | Adams | H01Q 25/02 342/352 |
| 2016/0134006 A1 * | 5/2016 | Ness | H01Q 3/02 343/880 |
| 2017/0285158 A1 * | 10/2017 | Halbert | G01S 13/878 |

* cited by examiner

*Primary Examiner* — Erin F Heard
*Assistant Examiner* — Donald H B Braswell
(74) *Attorney, Agent, or Firm* — Kirton McConkie; Brian Tucker

(57) ABSTRACT

A mainlobe detection process can include a number of tests that are performed to define when the monopulse antenna system will transition from open loop scanning to closed loop scanning and then to tracking. A hybrid tracking technique is also provided which adaptively discovers and corrects for phase alignment error. Magnitude-only tracking can be performed initially to locate the nulls in the azimuth and elevation ratios and to identify the magnitudes of these ratios at these nulls. Phase tracking can be then performed. During phase tracking, phase corrections can be repeatedly applied to the azimuth and elevation difference channels to correct any phase error that may exist. During this process, the magnitudes of the ratios can be used to determine how the phase corrections should be adjusted. Once the hybrid tracking process is complete, the monopulse antenna system is properly phase-aligned and phase tracking will be correctly employed.

19 Claims, 15 Drawing Sheets

ADAPTIVE DISCOVERY AND CORRECTION OF PHASE ALIGNMENT ERRORS IN MONOPULSE ANTENNA SYSTEMS

CROSS-REFERENCE TO RELATED APPLICATIONS

This application is a continuation of U.S. patent application Ser. No. 15/420,424 which was filed on Jan. 31, 2017.

BACKGROUND

A monopulse antenna system is commonly used to implement radar tracking or to track intentional radiators. As its name implies, a monopulse antenna system employs a single pulse to identify the presence of an object in the field of view. This is possible due to the use of multiple antennas which can detect angle information from the arriving signal.

FIG. 1 illustrates an example block diagram of a typical dual-axis monopulse antenna system. As shown, a dual-axis monopulse antenna system may include four individual antennas (A, B, C, and D) each of which are driven by the same arriving signal. If an object is in the field of view of the monopulse antenna system, each individual antenna will receive the reflected (or transmitted) signal. These received signals (which are referred to as A, B, C, and D respectively) are then fed to a comparator network. Although not shown, some intermediate processing may be performed on the received signals prior to inputting them to the comparator network.

Due primarily to the slight differences in the positions/orientations of the individual antennas, the characteristics of the received signals will vary. The comparator network can detect these variations to allow the relative location of the object with respect to the boresight axis to be determined. In particular, the comparator network can generate three tracking channels: (1) a sum ($\Sigma$) of the four received signals; (2) an azimuth difference ($\Delta_{az}$); and (3) an elevation difference ($\Delta_{el}$). As one of skill in the art would understand how these tracking channels can be employed to identify and track the position of an object, no further description will be provided.

As with most antennas, monopulse antennas produce a mainlobe (or main beam) and various sidelobes. In many situations, it will be possible to detect the presence of an object (or intentional radiator) whenever the object is positioned within the mainlobe or within one of the sidelobes due to the relatively high gain of some sidelobes. Therefore, even if the monopulse antenna is not pointed directly at the object, it may still receive a strong enough signal to detect the object's presence. However, if the object is within a sidelobe, and if the comparator network detects a sum channel peak or a difference channel null, the antenna will incorrectly assume that it is pointing directly at the object.

In typical monopulse antenna systems, an open-loop GPS and navigation data backbone is employed to perform coarse tracking. In other words, GPS data of the object to be tracked is supplied to the monopulse antenna system to allow the monopulse antenna system to initially point the antenna in the general direction of the object. Using GPS data in this way also requires that the antenna be physically oriented with respect to true north which can be a tedious process.

Additionally, as part of this tracking system, a modem lock signal will typically be employed as an indicator to the system that tracking is occurring. At sufficiently large target ranges, because the mainlobe gain is higher than the sidelobe gains, a SNR sufficient to establish the modem lock should only exist when the object is within the antenna's mainlobe. However, the fact that a modem lock can be established does not necessarily imply that the object is within the antenna's mainlobe. In many situations, an adequate SNR for establishing a modem lock may exist even though the object is positioned within the antenna's sidelobe. In such situations, the monopulse antenna system will track the object using a sidelobe when the desired outcome is to track within the mainlobe. This increases the risk of dropping the link due to marginal signal-to-noise ratio performance as the target moves away. Accordingly, a modem lock is a poor indicator of mainlobe tracking.

BRIEF SUMMARY

The present invention extends to techniques for implementing a mainlobe detection process in a monopulse antenna system. The mainlobe detection process can include a number of tests that are performed to define when the monopulse antenna system will transition from open loop scanning to closed loop scanning and then to tracking. Once tracking has commenced and all tests have passed, it ensures that the target is within the mainlobe of the monopulse antenna. The present invention also extends to a hybrid tracking technique in which a magnitude-only tracking method is performed prior to phase tracking to allow phase tracking to facilitate the auto-correction of phase-alignment errors between the monopulse antenna system and the monopulse antenna feed comparator network. Magnitude-only tracking can be performed initially to locate the difference channel nulls and to identify the average magnitudes of the difference-to-sum channel tracking ratios at these nulls. Phase tracking can then be performed. During phase tracking, phase corrections can be repeatedly applied to the azimuth and elevation difference channels to attempt to offset any phase error that may exist. During this process, the magnitudes of the tracking ratios near the difference channel nulls are used to determine how the phase corrections should be adjusted.

In another embodiment, the present invention is implemented as a method for performing tracking in a monopulse antenna system that provides tracking in the azimuth axis or the elevation axis or in both the azimuth and elevation axes. While magnitude-only tracking is being performed, a first azimuth magnitude parameter that represents a magnitude of the azimuth ratio over a number of magnitude steering iterations and/or a first elevation magnitude parameter that represents a magnitude of the elevation ratio over the number of magnitude steering iterations can be stored. Additionally, an azimuth direction indicator that represents a phase of the azimuth ratio over the number of magnitude steering iterations and/or an elevation direction indicator that represents a phase of the elevation ratio over the number of magnitude steering iterations can also be stored. After magnitude tracking has been performed for the number of magnitude steering iterations, the azimuth direction indicator and/or the elevation direction indicator can be compared to a defined threshold. Upon determining that the azimuth direction indicator and/or the elevation direction/indicator is below the defined threshold, phase tracking can be commenced.

In another embodiment, the present invention is implemented as a monopulse antenna system comprising: a monopulse antenna comprising a number of monopulse antenna elements; a comparator network that generates a sum channel, an azimuth difference channel, and an elevation difference channel from a signal received at the monopulse antenna; and a monopulse detector assembly that receives the sum channel, the azimuth difference channel, and the elevation difference channel from the comparator network and generates an azimuth ratio and an elevation ratio from the channels. The monopulse detector assembly is configured to perform hybrid tracking in which magnitude-only tracking is performed prior to phase tracking.

In another embodiment, the present invention is implemented as a method for detecting the mainlobe in a monopulse antenna system and then tracking on the mainlobe. During open loop scanning, an initial power-level test is performed to identify when a lobe has been located. In response to the initial power-level test passing, closed loop scanning is commenced. During closed loop scanning, a track-lock test is performed to identify when the mainlobe has been located. In response to the track-lock test passing, hybrid tracking is commenced in which magnitude-only tracking is initially performed and then phase tracking is performed.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
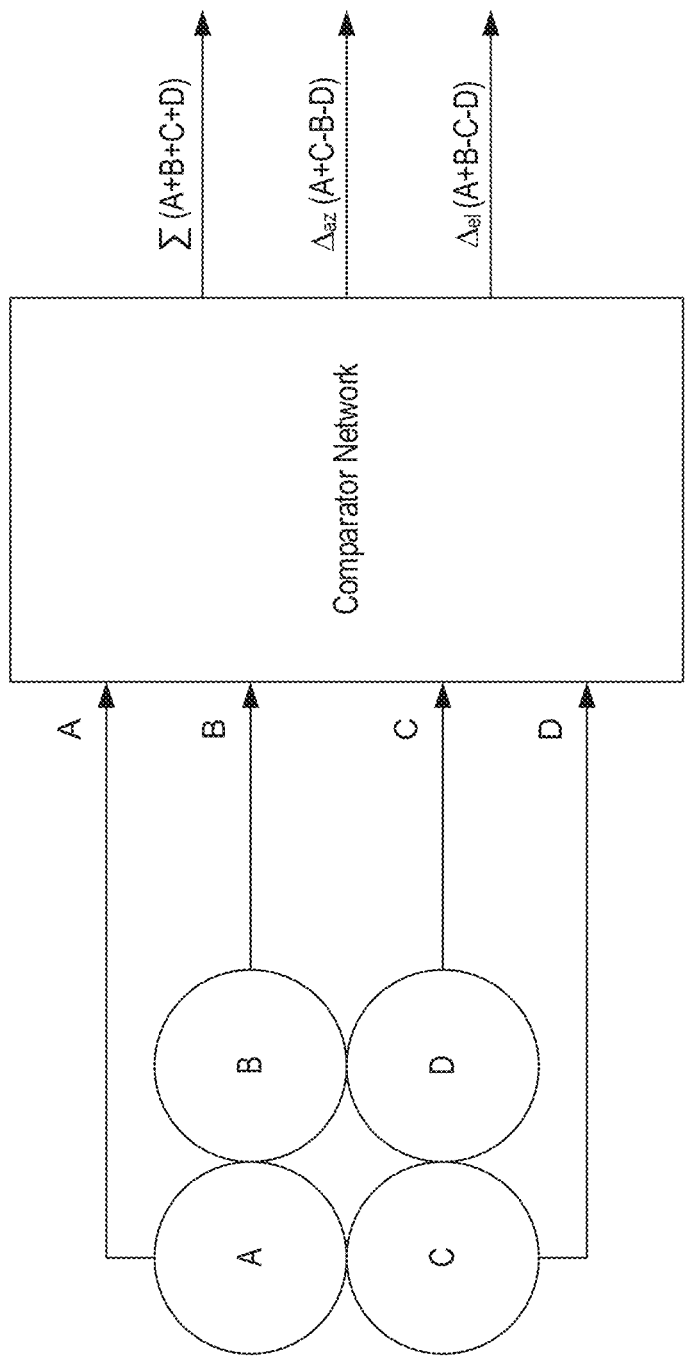
FIG. 1 provides a block diagram of a typical monopulse antenna system.
Figure 2:
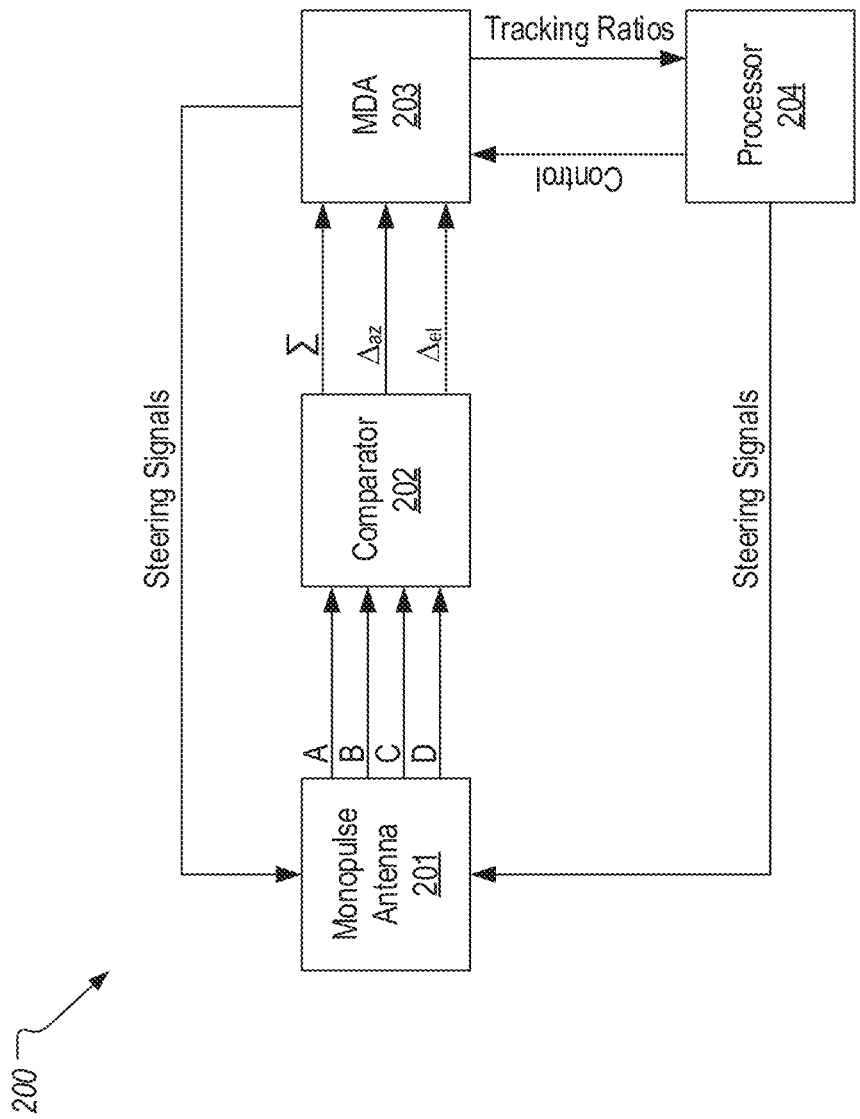
FIG. 2 illustrates a block diagram of a monopulse antenna system that is configured in accordance with one or more embodiments of the present invention.

MDA 203 can be configured to implement the techniques of the present invention to ensure that monopulse antenna 201 is oriented such that the object to be tracked will be positioned within the mainlobe rather than a sidelobe. In other words, MDA 203 can generate steering signals to control the orientation of monopulse antenna 201 in accordance with the techniques of the present invention as will be described below. Monopulse antenna system 200 may also typically include a processor 204 which can interface with MDA 203 to provide control signals to and to receive state and tracking information from MDA 203. Also, processor 204 can be configured to interface with monopulse antenna 201 for the purpose of providing steering signals. Although not shown, monopulse antenna system 200 may include a steering component with which MDA 203 and processor 204 interface for purposes of steering monopulse antenna 201.

By way of overview, the present invention utilizes a series of tests during the steering of the monopulse antenna to ensure that tracking is only performed on the mainlobe. Initially, the monopulse antenna can be steered in an open loop scan mode. Open loop refers to the fact that the monopulse antenna is steered independently of the RF signal it receives. For example, while in open loop scan mode, the monopulse antenna can be steered relatively quickly along a spiral or zig zag pattern in an attempt to locate an object. Processor 204 can provide the steering signals to monopulse antenna 201 when in the open loop scan mode. In contrast, closed loop scanning refers to steering the antenna based on the azimuth and elevation tracking errors that are produced from the channel measurements. Therefore, closed-loop tracking often involves relatively slow/small movements in comparison to open loop scanning. Because closed loop scanning is based on the tracking channels, MDA 203 can be tasked with steering monopulse antenna 201 during closed loop scanning. In either case, the monopulse antenna can be steered either mechanically (i.e., by physically moving the monopulse antenna) or electrically (e.g., by using phased array techniques).

Continuing the overview, while processor 204 steers monopulse antenna 201 in open loop scanning, MDA 203 can process the three tracking channels to determine whether an object appears in the field of view of monopulse antenna 201 (e.g., based on a comparison of the sum channel power to the difference channel powers). Once MDA 203 detects that an object is present within the field of view (defined as the initial power-level test conditions), control of the steering can be turned over to MDA 203 to allow MDA 203 to determine whether the object is located within the mainlobe of monopulse antenna 201. If MDA 203 determines that the object is within the mainlobe, it declares track lock and continues to track the object. However, if MDA 203 determines that the object is within a sidelobe, it can pass steering control back to processor 204 to recommence open loop scanning. This process can be repeated as necessary until the monopulse antenna 201 is steered towards the object such that tracking can occur on the mainlobe.

Figure 3A:
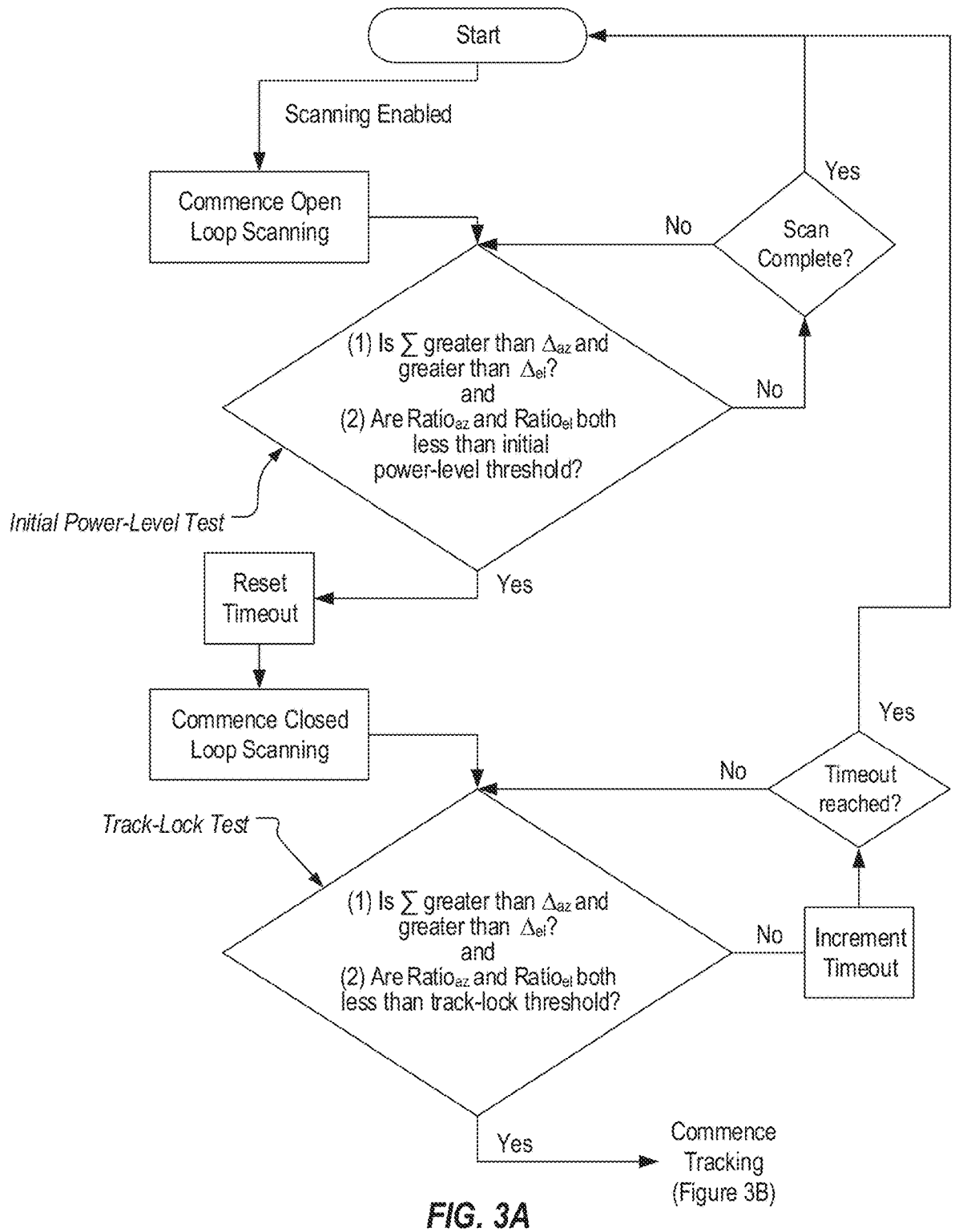
FIGS. 3A and 3B illustrate a flow chart of a mainlobe detection process.
Figure 3B:
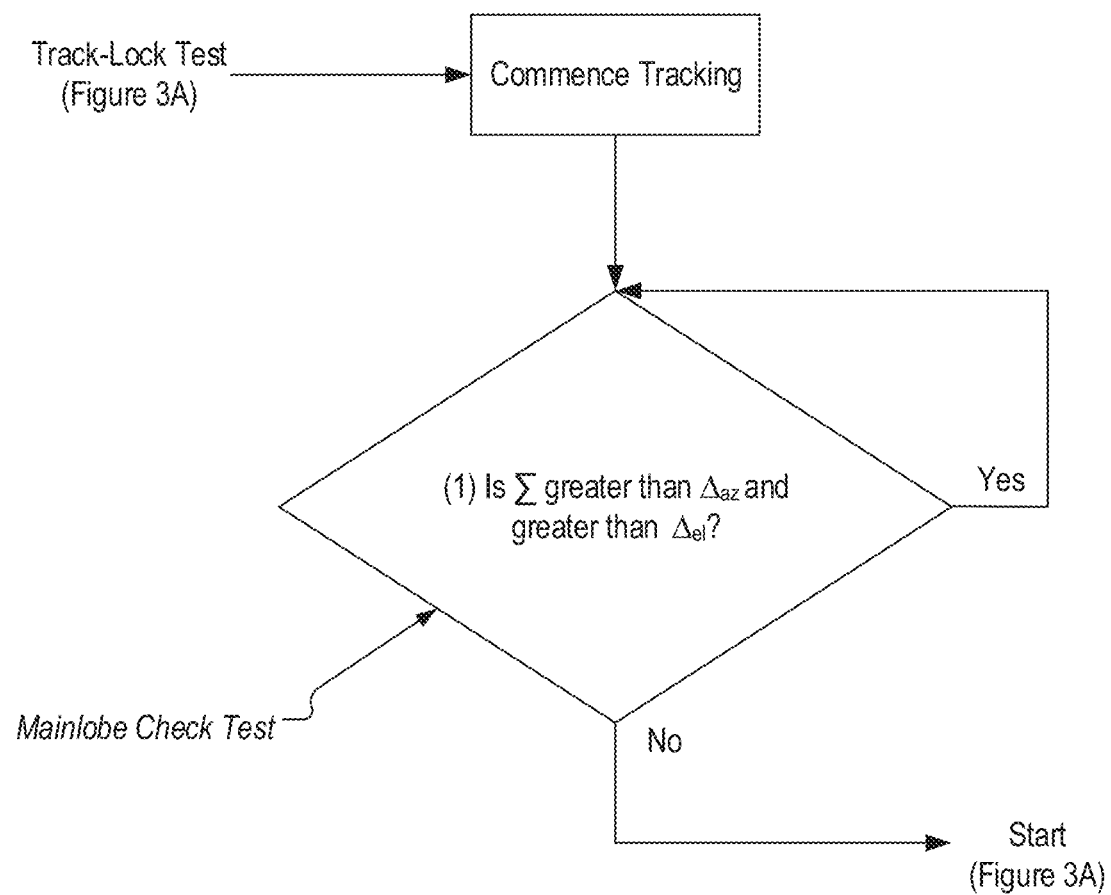

FIGS. 3A and 3B provide a flowchart of this mainlobe detection process. As indicated above, MDA 203 is primarily tasked with performing the steps of this process. Therefore, FIGS. 3A and 3B generally represent the steps performed by MDA 203. However, processor 204 can also be involved in providing various control inputs and in monitoring the state of the process. The interactions that may occur between MDA 203 and processor 204 are described more fully below with respect to the state diagram of FIG. 4.

The mainlobe detection process can commence when open loop scanning is enabled. For example, processor 204 (or more specifically, software executing on processor 204) could instruct MDA 203 to commence the mainlobe detection process. When open loop scanning is commenced, an initial power-level test can be iteratively performed by MDA 203. As shown, this initial power-level test can include (1) determining whether the sum channel power is greater than each of the difference channel powers. In some embodiments, this initial power-level test may also include (2)

determining whether the azimuth ratio and the elevation ratio are each less than an initial power-level threshold.

When an object is present within the field of view of monopulse antenna 201, the sum channel power will exceed both the azimuth channel power and the elevation channel power. Therefore, when MDA 203 detects that this condition is met, it can transition into a closed loop scanning mode. The azimuth and elevation ratio represent the ratio of the azimuth difference channel to the sum channel $$\left(\frac{\Delta az}{\Sigma}\right)$$

and the ratio of the elevation difference channel to the sum channel $$\left(\frac{\Delta el}{\Sigma}\right)$$

respectively and can therefore serve to define a threshold for when the initial power-level condition will cause a transition into the closed loop scanning mode. In other words, this second condition of the initial power-level test can prevent closed loop scanning from being performed when the sum channel power only slightly exceeds the difference channel powers.

This initial power-level threshold (as well as the track-lock threshold described below) can be a configurable parameter so that the "sensitivity" of the process can be fine-tuned for a given environment. For example, in environments when multipath reflections may occur (e.g., when monopulse antenna system 200 is positioned above the object to be tracked and will therefore receive reflections from the earth's surface), a higher value for the initial power-level threshold may be desirable.

As mentioned above, the transition from open loop scanning to closed loop scanning involves allowing MDA 203 to control the steering of monopulse antenna 201 based on the RF signal received by the antenna (i.e., based on the values of the three channels). The fact that the initial power-level test has succeeded indicates that an object is present within a lobe of monopulse antenna 201. However, at this point, it is still unknown whether the object is within the mainlobe or within one of the sidelobes.

Figures 5A, 5B:
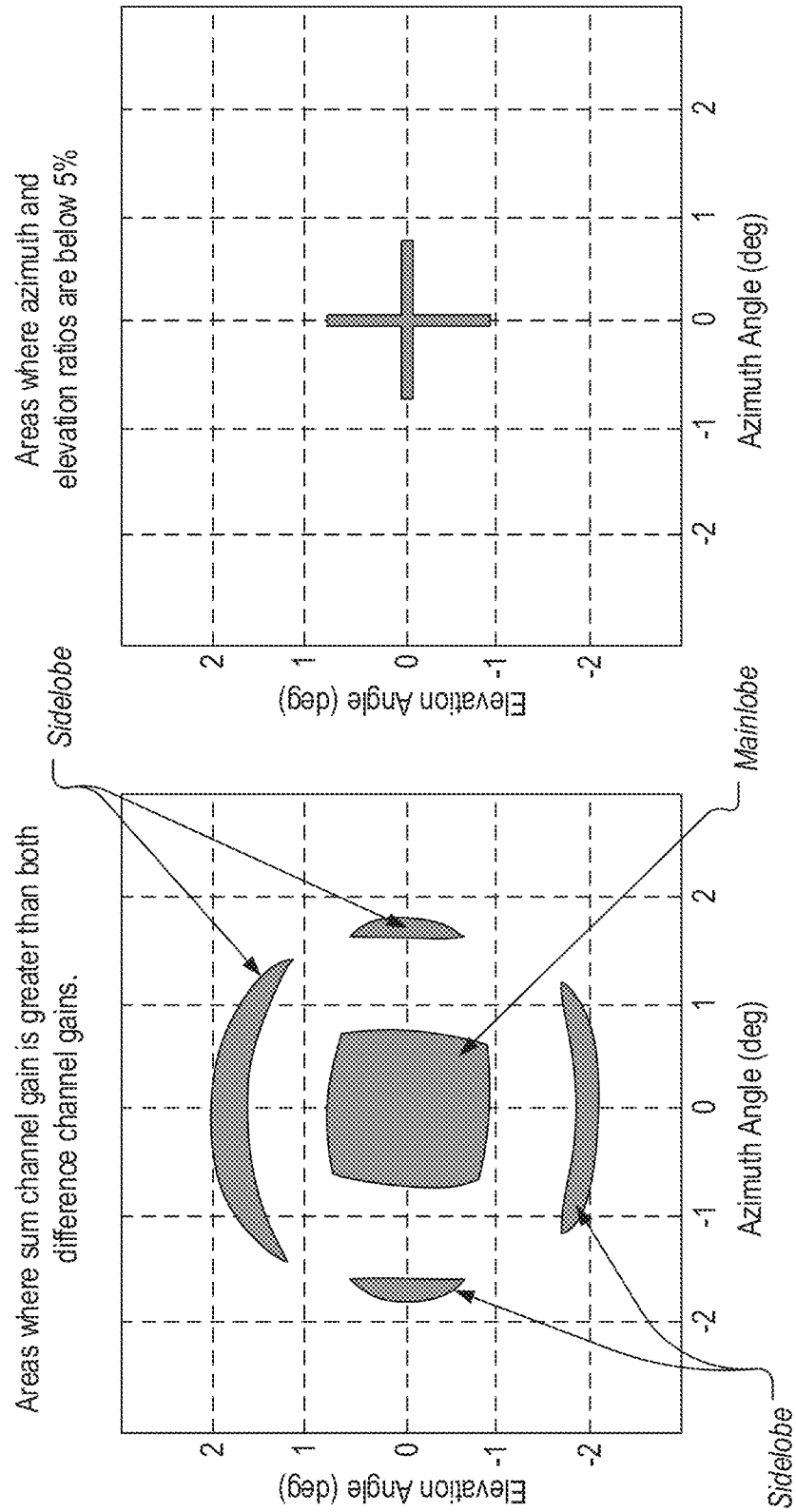
FIGS. 5A-5C provide various charts representing how the mainlobe detection process can detect the mainlobe and the process results unique to the mainlobe.

FIG. 5A provides a plot identifying the areas where the sum channel gain exceeds both difference channel gains. This plot can be interpreted as the composite (including sum, azimuth, and elevation channels) gain profile that would be seen when looking directly at monopulse antenna 201. Accordingly, the mainlobe is centered at 0° azimuth and 0° elevation and a number of sidelobes are positioned around the mainlobe as indicated. It is noted that this plot is simplified for illustrative purposes to remove various weaker sidelobes. In this example, if an object was positioned within the mainlobe or any of the sidelobes, the received signal would exhibit characteristics that would cause the initial power-level test to pass. In other words, even when the object is in one of the labeled sidelobes, the sum channel power would still exceed both difference channel powers. Both the azimuth and elevation ratios should also be below the initial power-level threshold when the object is in one of the labeled sidelobes. Accordingly, the initial power-level test functions as a "power test" for identifying when an object is located within a lobe.

To ensure that MDA 203 does not commence tracking the object when the object is within a sidelobe, MDA 203 can be configured to perform two additional tests. Initially, upon commencing closed loop scanning, MDA 203 can perform a track-lock test. As with the initial power-level test, the track-lock test can involve: (1) ensuring that the sum channel power remains greater than both the difference channel powers; and (2) determining whether the azimuth ratio and the elevation ratio are each less than a track-lock threshold. This track-lock threshold can be substantially less than the initial power-level threshold in order to increase confidence that the object is within the mainlobe. By way of example only, the initial power-level threshold may be 50% and the track-lock threshold may be 5%. However, as indicated above, these thresholds can be configurable to fine-tune the system for a particular environment.

This track-lock test is iteratively performed while MDA 203 steers monopulse antenna 201 based on the received values of the tracking channels. In other words, MDA 203 makes small adjustments to the orientation of monopulse antenna 201 to attempt to center the object within the lobe. As this centering is performed, the sum channel power relative to the difference channel powers should increase (i.e., MDA 203 will steer monopulse antenna 201 to minimize the azimuth and elevation ratios).

Each time the track-lock test is performed and fails, the timeout parameter can be incremented. The timeout parameter is used to set a test parameter to determine if the system will pass the test in a suitable amount of time. When testing near the mainlobe, the test will always pass under a certain time period. However, for locations other than the mainlobe, the test may never pass, but closed-loop tracking would continue were it not for a timeout period. If the timeout value reaches a particular value (e.g., 100), it can be assumed that the object is within a sidelobe, or certainly not in the mainlobe. More specifically, if the object is within a sidelobe, there may be no orientation within this sidelobe that will cause the track-lock test to pass. As a result, MDA 203 can pass steering control back to processor 204 to recommence the open loop scanning process to attempt to locate the mainlobe. In contrast, if the track-lock test passes, it implies that the sum channel power greatly exceeds the difference channel powers, and, as such, the object may likely be within the mainlobe and tracking can be commenced.

FIG. 5B provides a plot illustrating the area where both the azimuth and elevation ratios are below the track-lock threshold (e.g., below 5%). As shown, in this case, the conditions of the track-lock test are met only within a small portion (the + shaped portion) of the mainlobe. Accordingly, if during open loop scanning, the object comes within one of the sidelobes and passes the initial power-level test, closed loop scanning will commence within that sidelobe. Because the ratios required by the track-lock test do not exist within the sidelobe, the track-lock test will eventually time out causing open loop scanning to be resumed. In contrast, if during open loop scanning, the object comes within the mainlobe, the subsequent closed loop scanning will cause monopulse antenna 201 to eventually be oriented directly towards the object (i.e., oriented so that the object is within the + shaped region of FIG. 5B) thereby causing the track-lock test to succeed.

The initial power-level and track-lock tests can be performed very quickly such that a number of closed loop scanning intervals can be performed in a relatively short amount of time. Therefore, even if the track-lock test is performed on a number of sidelobes prior to reaching the mainlobe, mainlobe tracking can ultimately be achieved in a reasonable amount of time. The values of the initial power-level and track-lock thresholds can be set to control how quickly this acquisition may occur.

In some embodiments, once the initial power-level and track-lock tests have passed, MDA 203 can commence tracking the object using the current values of the azimuth and elevation ratios. In some embodiments, this tracking can be performed in a "magnitude-only mode" in which the magnitudes alone of the azimuth and elevation ratios (or tracking error) are used to steer monopulse antenna 201 (i.e., tracking is performed independently of the phase). During this tracking, a mainlobe-check test can be continuously performed to ensure that the object remains within the mainlobe. As shown in FIG. 3B, this mainlobe-check test can be the same as the initial power-level condition of the initial power-level test, namely, whether the sum channel power remains greater than both the difference channel powers. If, during tracking, the object moves outside of the mainlobe, this mainlobe-check test will fail thereby causing MDA 203 to return steering control back to processor 204 which may resume the open loop scanning process in an attempt to again orient the mainlobe towards the object.

Even with a low value for the track-lock threshold, there may still be some very infrequent scenarios where the track-lock test will pass when the object is located within the sidelobe (e.g., when the target is relatively close to monopulse antenna 201 and strong receive signals are present). The discriminator for these circumstances is built-in to the inherent phase response of the antenna feed comparator network, and can only be exploited when in phase tracking mode. In other words, when closed-loop tracking attempts to pass the track-lock test, MDA 203 could be commanded to be run in either magnitude-only mode or phase mode for tracking. Only in phase tracking mode can the MDA discriminate against situations where the azimuth or elevation ratio magnitudes are less than the track-lock threshold when the target is actually on a sidelobe. As an overview, this phase tracking can employ the phase of the azimuth and elevation tracking ratios (as represented by the sign of the azimuth and elevation ratios) to steer monopulse antenna 201 towards a center of the mainlobe. Due to the differences between the phase pattern within the mainlobe and the phase patterns within the sidelobes, when an object is being tracked within a sidelobe, this phase tracking will cause monopulse antenna 201 to be steered away from the center of the sidelobe. This will ultimately cause the mainlobe check test to fail thereby causing open loop scanning to be resumed.

Figure 5C:
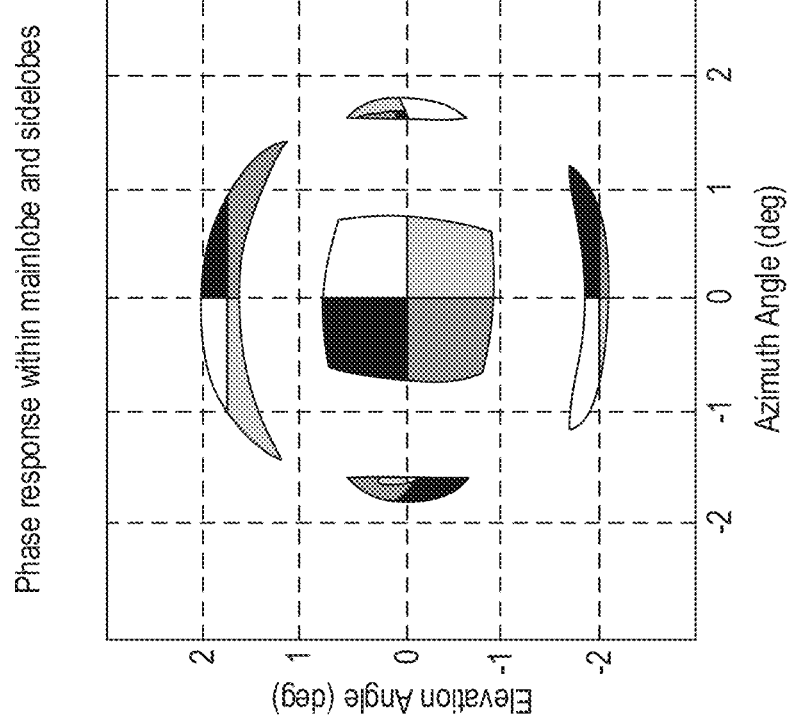

FIG. 5C provides a plot illustrating the phase pattern that exists within the mainlobe and the various sidelobes that are represented in FIG. 5A. As is known, each of the A, B, C, and D signals produced by a monopulse antenna will have a phase. In theory, if the object is located directly in the center of the mainlobe and the phase response of the monopulse antenna system is properly aligned, each of these signals will have the same phase. However, if the object's location is offset from this "zero phase" position, and phase is taken into account, the azimuth and elevation difference ratios can be either positive or negative. For example, if the object is located at 0.5 degrees azimuth, the phase differences in the A, B, C, and D signals may cause the azimuth difference ratio to be positive, while if the object is located at −0.5 degrees azimuth, the phase differences in the A, B, C, and D signals may cause the azimuth difference ratio to be negative. A similar transition in the phase may occur along the elevation axis.

MDA 203 can employ these azimuth and elevation phase transitions during tracking. More particularly, MDA 203 can steer monopulse antenna 201 based on the sign of the azimuth and elevation ratios (or equally based on the sign of the azimuth and elevation difference channels). With reference to FIG. 5C, if the tracked object is located in either of the right-sided quadrants (relative to the azimuth angle 0° reference), the azimuth ratio may have a non-zero positive value, and if the tracked object is located in either of the left-sided quadrants (relative to the azimuth angle 0° reference), the azimuth ratio may have a non-zero negative value. Similarly, if the tracked object is located in either of the top quadrants (relative to the elevation angle 0° reference), the elevation ratio may have a non-zero positive value, and if the tracked object is located in either of the bottom quadrants (relative to the elevation angle 0° reference), the elevation ratio may have a non-zero negative value. MDA 203 can be configured to steer monopulse antenna 201 based on the signs of these ratios. The tables below provide one example of how MDA 203 can be configured to steer monopulse antenna 201 when performing phase tracking. It is noted that the sign of the ratios will depend on how the azimuth and elevation difference channels are produced (e.g., whether the azimuth difference channel is produced as A+C−B−D or B+D−A−C) and therefore the steering directions are relative to how the difference channels are produced.

| Sign of Azimuth Ratio | Direction to Steer | Sign of Elevation Ratio | Direction to Steer |
|---|---|---|---|
| + | Right | + | Up |
| − | Left | − | Down |

As can be seen, based on these rules during phase tracking, MDA 203 will continuously steer monopulse antenna 201 to cause the object to be located at the phase transition point in each axis (i.e., where the azimuth and elevation ratios approach zero) which, in theory, should exist at the point where the ratios are minimized (i.e., at the point where the difference between the sum channel gain and the difference channel gains is maximized). Due to this tracking, monopulse antenna 201 will remain oriented properly towards the object such that the mainlobe-check test will repeatedly succeed.

Turning again to FIG. 5C, it is noted that the phase pattern within the sidelobes is not the same as the phase pattern within the mainlobe. For this reason, if phase tracking is being performed on a sidelobe, MDA 203 will cause monopulse antenna 201 to steer away from the object. This would force a failure during the mainlobe check test. For example, if the object is located within the top left (or white) quadrant of the upper sidelobe, the elevation and azimuth ratios will both have a positive sign. Based on the rules above, this will cause MDA 203 to steer monopulse antenna 201 in an upward and rightward direction. In other words, the signs of the ratios will cause MDA 203 to believe the object is above and to the right of the center point of the lobe when in fact the object is above and to the left of the center point. As a result, after MDA 203 steers monopulse antenna 201, the object will eventually be located outside the upper sidelobe where the sum channel power will not be greater than the difference channel powers thereby causing the mainlobe check test to fail. In this way, MDA 203 employs phase to cause the mainlobe check test to fail when tracking is performed on a sidelobe thereby causing open loop scanning to be resumed in order to locate the mainlobe.

In some embodiments, the track-lock test may include an additional condition which monitors the variation in the sum channel power. When on the mainlobe, there should, in theory, be very little variation in the sum channel power across readings. In contrast, when on a sidelobe, the sum channel power may vary substantially. MDA 203 can therefore record the sum channel power level at each sampling and use these recorded levels to verify whether the power level has varied in excess of some threshold (e.g., whether the sum channel power level has varied by more than 2 dB over a series of ten samples). If the sum channel power varies in excess of this threshold, the track-lock test can fail thereby causing open loop scanning to be resumed. This variance threshold can be a configurable parameter as with the other thresholds. For example, in multipath conditions or for a fast-moving target, the sum channel power may vary significantly by comparison when on the mainlobe. In such cases, the variance threshold can be set to a higher level to prevent the track-lock test from incorrectly failing. A primary benefit of employing the variance threshold in the track-lock condition is that it may cause the track-lock test to fail before the timeout has been reached. In this way, less time will be spent doing closed loop scanning within a sidelobe.

Figure 4:
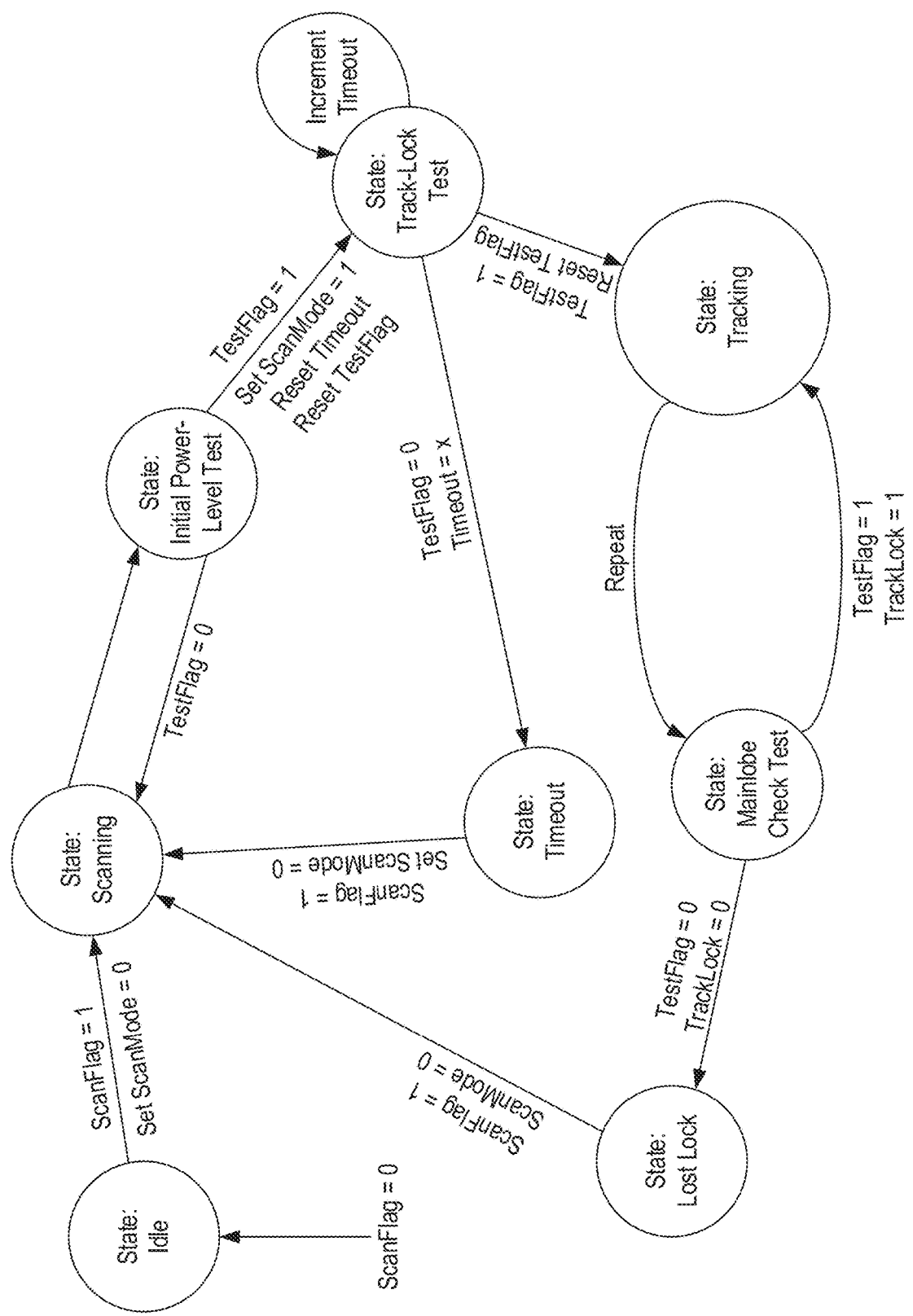
FIG. 4 provides a state diagram of the mainlobe detection process.

FIG. 4 illustrates a state diagram for the above described process and represents how MDA 203 and processor 204 can interact. A number of control and state parameters can be employed to enable processor 204 to monitor and control MDA 203 during the process. These parameters include a ScanFlag parameter which when set will enable the scanning process, a ScanMode parameter which defines whether open or closed loop scanning will be performed, a Timeout parameter which tracks the number of iterations of the track-lock test, a TestFlag parameter which identifies the success or failure of the current test, and a TrackLock parameter which represents whether the target is currently being tracked. In some embodiments, processor 204 can set the value of the ScanFlag and ScanMode parameter while MDA 203 can set the value of the TestFlag and TrackLock parameters as will be described below. This state diagram and the parameters are exemplary and are only intended to represent one way in which MDA 203 and processor 204 could be configured to interact.

Whenever the ScanFlag parameter is set to 0, monopulse antenna system 200 will be in an idle state (i.e., neither scanning nor tracking). Whenever it is desired to commence the mainlobe detection process, processor 204 can set the ScanFlag parameter to 1 thereby transitioning monopulse antenna system 200 into the scanning state. As part of this transition, processor 204 can set the ScanMode parameter to 0 thereby indicating that open loop scanning should be performed (i.e., instructing MDA 203 that it will not control the steering of antenna 201). As open loop scanning is commenced, the MDA 203 can commence performing the initial power-level test while open loop scanning is occurring.

Monopulse antenna system 200 will remain in the initial power-level test state until either the initial power-level test succeeds or the scan is completed. As long as the ScanFlag parameter remains set, the system may reset the scan and continue performing the scan pattern. In contrast, if the test succeeds, MDA 203 can set the TestFlag parameter to 1 thereby causing the system to transition into the track-lock test state. In response to the TestFlag parameter being set to 1, processor 204 can set the ScanMode parameter to 1 to indicate to MDA 203 that it should commence closed loop tracking. Also, the Timeout and TestFlag parameters can be reset so that they can be used during the track-lock test.

The track-lock test is performed in a similar manner as the initial power-level test. However, each time the track-lock test is performed, the Timeout parameter can be incremented. If the Timeout parameter reaches a defined value x, the system will transition into the timeout state. If the ScanFlag parameter remains set, processor 204 can set the ScanMode parameter to 0 to cause open loop scanning to be resumed and the process restarted. In contrast, if the track-lock test succeeds, MDA 203 can set the TestFlag parameter to 1 which will cause the system to transition into the tracking state. As part of this transition, the TestFlag parameter can again be reset.

Once in the tracking state, MDA 203 can commence tracking the object using one of the modes described above (magnitude-only or phase mode) or even a hybrid tracking mode (for the purpose of antenna feed phase correction) which will be described below. While tracking, the system will repeatedly check the mainlobe-check test state. If the mainlobe-check test succeeds, MDA 203 can set the TestFlag parameter to 1 causing the system to remain in the tracking state and also set the TrackLock parameter to 1 to indicate to processor 204 that tracking is occurring. In contrast, if the mainlobe-check test fails, the TestFlag parameter can be set to 0 to cause the system to transition to the lost lock state. The TrackLock parameter can also be set to 0 to indicate that the object is no longer being tracked. When in the lost lock state, the system will return to open loop scanning as long as the ScanFlag parameter remains set. As part of this transition, processor 204 can set the ScanMode parameter to 0 to inform that system that the MDA tracking commands can be ignored.

The above described phase tracking is based on the premise that the phase transitions from positive to negative at the same location where the corresponding ratio is minimized. Hence, phase alignment to the phase response of the antenna comparator feed network is required for correct phase tracking. Based on this premise, by steering monopulse antenna 201 to these "phase zero crossings," MDA 203 will also be steering monopulse antenna 201 to the point where the difference between the sum channel power and the difference channel powers is maximized. However, there are situations where the phase zero crossings may not coincide with the ratio nulls making phase tracking less effective or even completely erroneous.

Figure 6A:
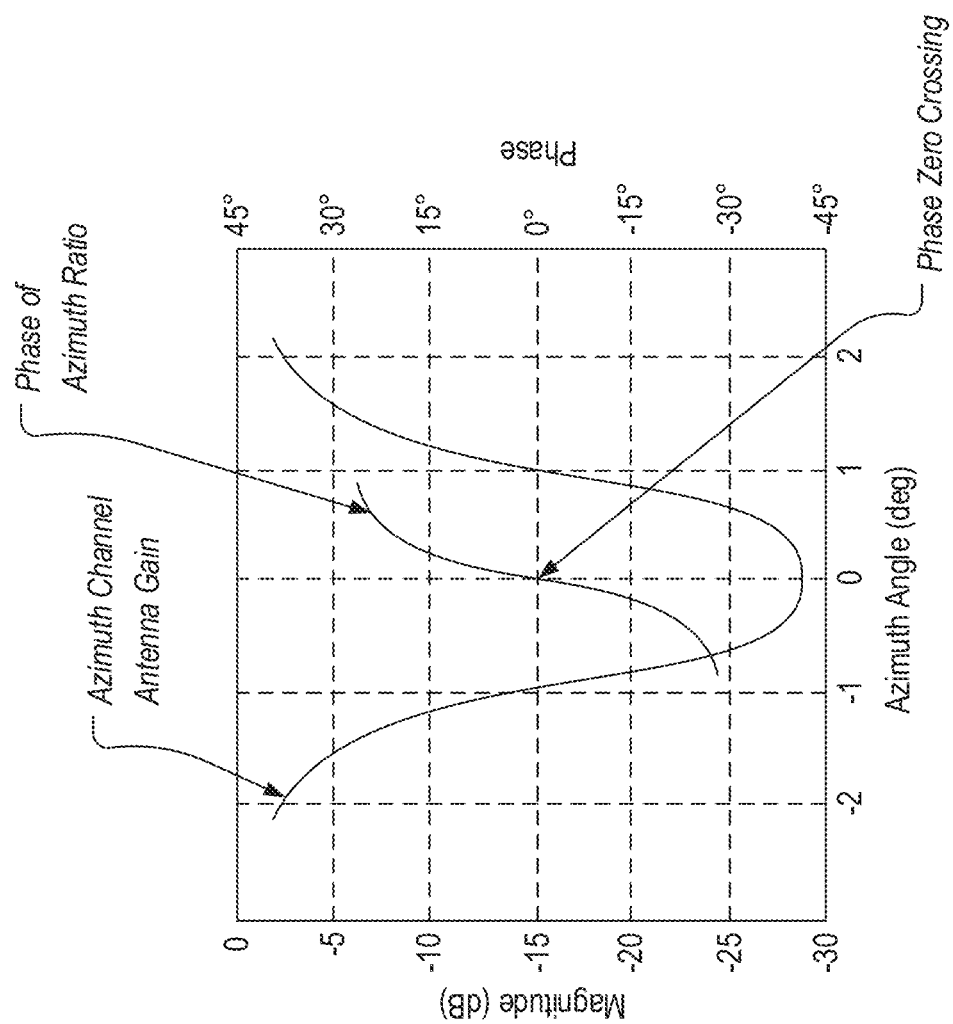
FIGS. 6A-6C provide various charts depicting how an antenna feed phase alignment error may exist.
Figure 6B:
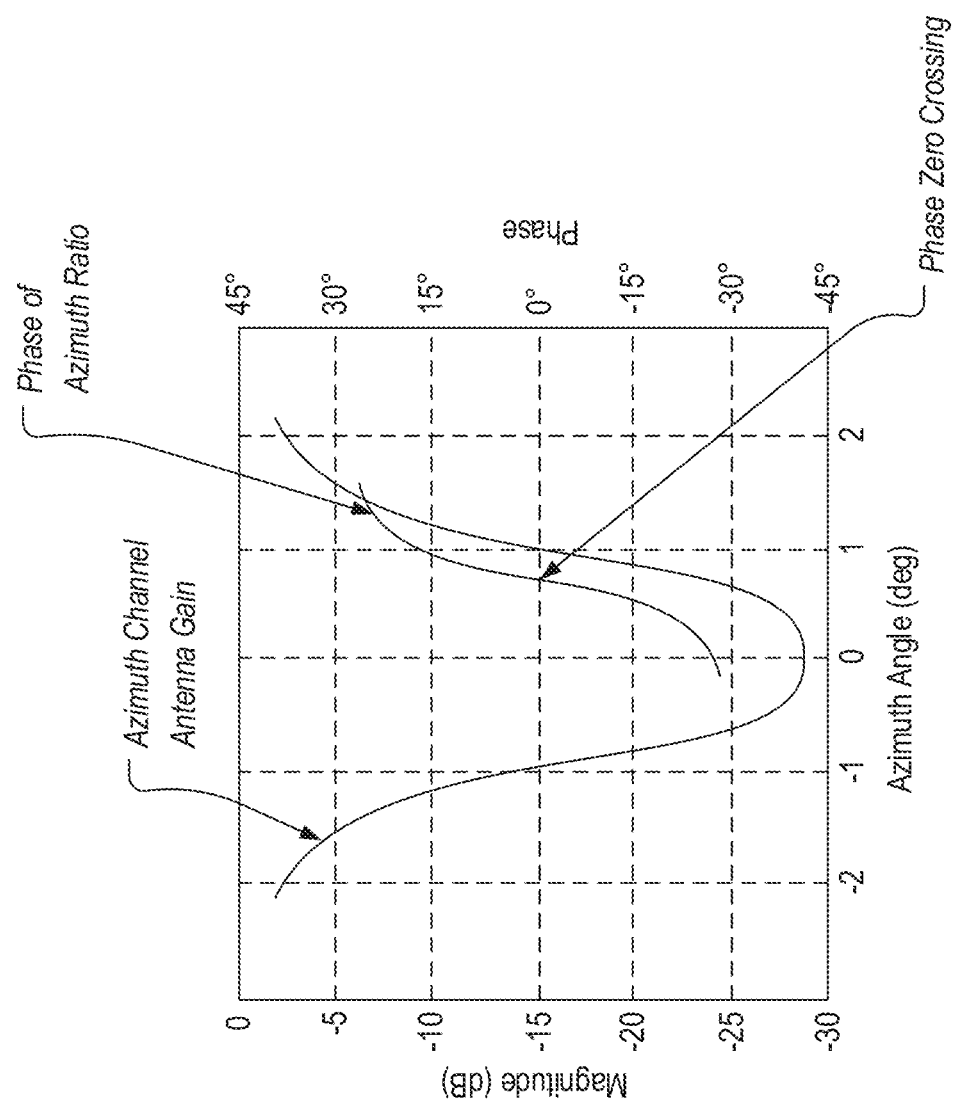

FIG. 6A provides a plot illustrating a case where the azimuth phase zero crossing coincides with the azimuth ratio null. In contrast, FIG. 6B provides a plot illustrating a case where the azimuth phase zero crossing is shifted to the right of the azimuth ratio null. Similar plots could be created for elevation but are not shown for sake of simplicity.

In these plots, the center horizontal line represents where the phase of the azimuth ratio transitions between positive and negative. The positive and negative values of the phase correspond directly to the sign of the azimuth or elevation ratio used to steer the antenna in phase tracking mode. In FIG. 6A, this phase zero crossing occurs at 0° azimuth which is also where the magnitude of the azimuth ratio is minimized. If it is assumed that the magnitude and phase of the elevation ratio similarly coincide, phase tracking would cause monopulse antenna 201 to be steered towards 0° azimuth and 0° elevation. In other words, the plot in FIG. 6A corresponds to what is shown in FIG. 5C.

In contrast, in FIG. 6B, the phase of the azimuth ratio is shifted to the right. Specifically, the phase zero crossing is shown as occurring at approximately 0.8° azimuth where the magnitude of the azimuth ratio is not minimized. In this scenario, phase tracking would cause monopulse antenna 201 to be steered away from the null in the azimuth ratio. More particularly, even if monopulse antenna 201 is initially oriented directly towards the azimuth null at 0°, the sign of the azimuth ratio will be negative indicating that the object is positioned to the left of the bore axis. If in phase mode, MDA 203 would steer monopulse antenna 201 to the left, away from the object. This leftward steering would continue until monopulse antenna 201 is offset by 0.8° to the left of the object. As shown in FIG. 6B, at this offset, the azimuth ratio is greatly increased which would negatively impact tracking. A similar result would happen if the phase of the elevation ratio is shifted from the elevation ratio null.

Figure 6C:
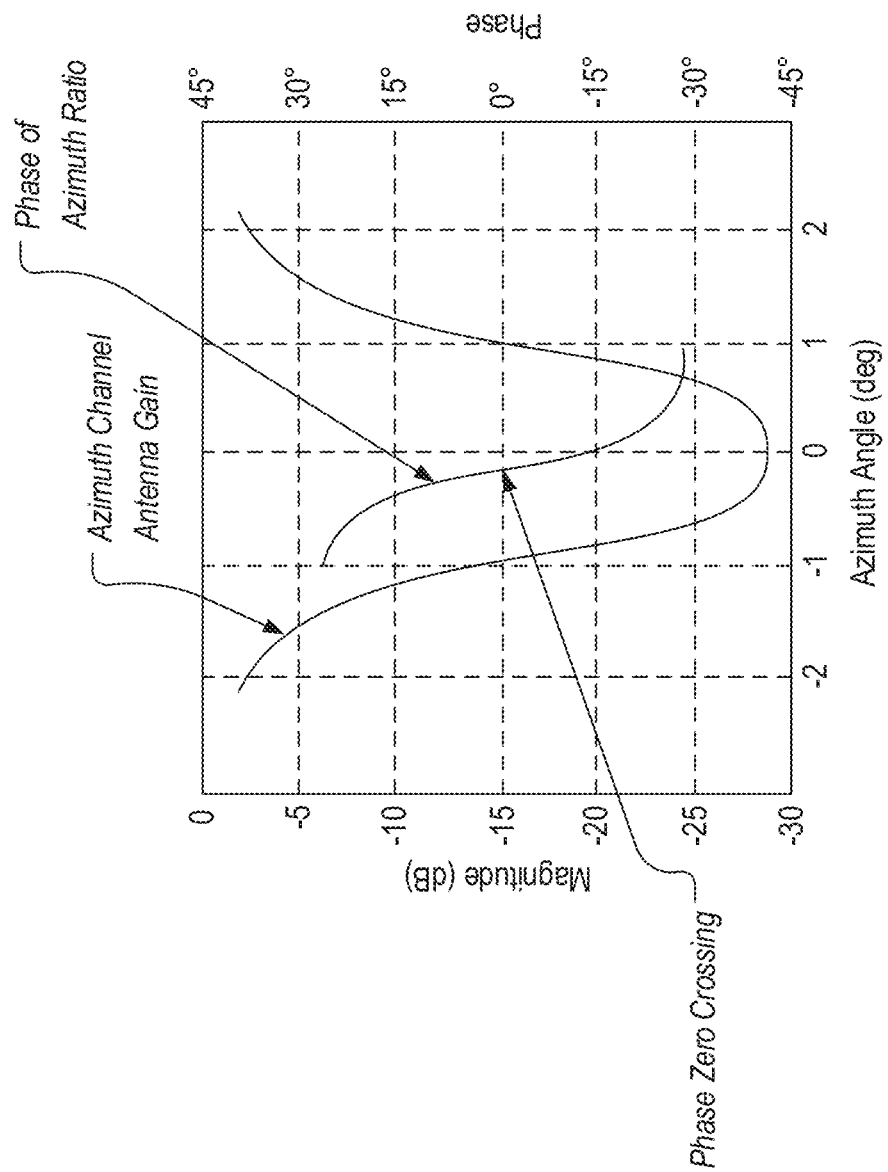

In a worst case scenario, the phase may be shifted so far that the phase is reversed at the corresponding ratio null. FIG. 6C illustrates this case for the azimuth ratio. As shown, the phase is positive to the left of the null and negative to the right of the null. Therefore, when phase tracking is employed, MDA 203 would steer monopulse antenna 201 away from the null and outside the mainlobe mistakenly believing that it is actually steering it towards the null. In essence, when the phase is shifted too much, the mainlobe will appear as a sidelobe during phase tracking thereby causing open loop scanning to be resumed even though the mainlobe had been located.

To correct for these phase shift scenarios, MDA 203 can be configured to perform "hybrid mode" tracking which employs a combination of both the magnitude-only tracking mode and the phase tracking mode of the azimuth and elevation ratios. In general, using phase mode for tracking is typically preferred to magnitude-only mode since it offers higher accuracy, is faster, has increased bandwidth response, and greater pull-in range. Hybrid mode tracking allows phase to be used even when a misalignment in the phase is occurring.

As an overview, in hybrid mode tracking, MDA 203 can initially perform magnitude-only tracking to steer monopulse antenna 201 towards the azimuth and elevation nulls. During this magnitude-only tracking, MDA 203 can generate various thresholds that will later be employed during phase tracking to ensure that a phase misalignment does not cause monopulse antenna 201 to be steered substantially away from the nulls. Then, MDA 203 can perform phase tracking including performing various calculations to correct (or offset) a phase misalignment. If, during phase tracking, it is determined that monopulse antenna 201 has become substantially misaligned, magnitude-only tracking can be resumed until the nulls are again located. This process of switching between magnitude-only tracking and phase tracking can be repeated as necessary to ensure that phase tracking can be accurately performed even when a phase misalignment is occurring.

Prior to describing hybrid mode tracking in detail, it is to be understood that, during either magnitude-only or phase tracking, MDA 203 will constantly make slight adjustments to the boresight angle of monopulse antenna 201 (i.e., steer the antenna) in an effort to align the boresight angle with the target (which may be moving relative to the antenna). In magnitude-only tracking, MDA 203 will steer monopulse antenna 201 to attempt to minimize the azimuth and elevation ratios without using the phase response to determine the sign of the tracking error, whereas, in phase tracking, MDA 203 will steer monopulse antenna 201 to attempt to locate the phase zero crossings in the azimuth and elevation ratios. Accordingly, after each steering iteration, MDA 203 will generate current azimuth and elevation ratios and then calculate, from these current ratios, how to subsequently steer monopulse antenna 201.

Figure 7A:
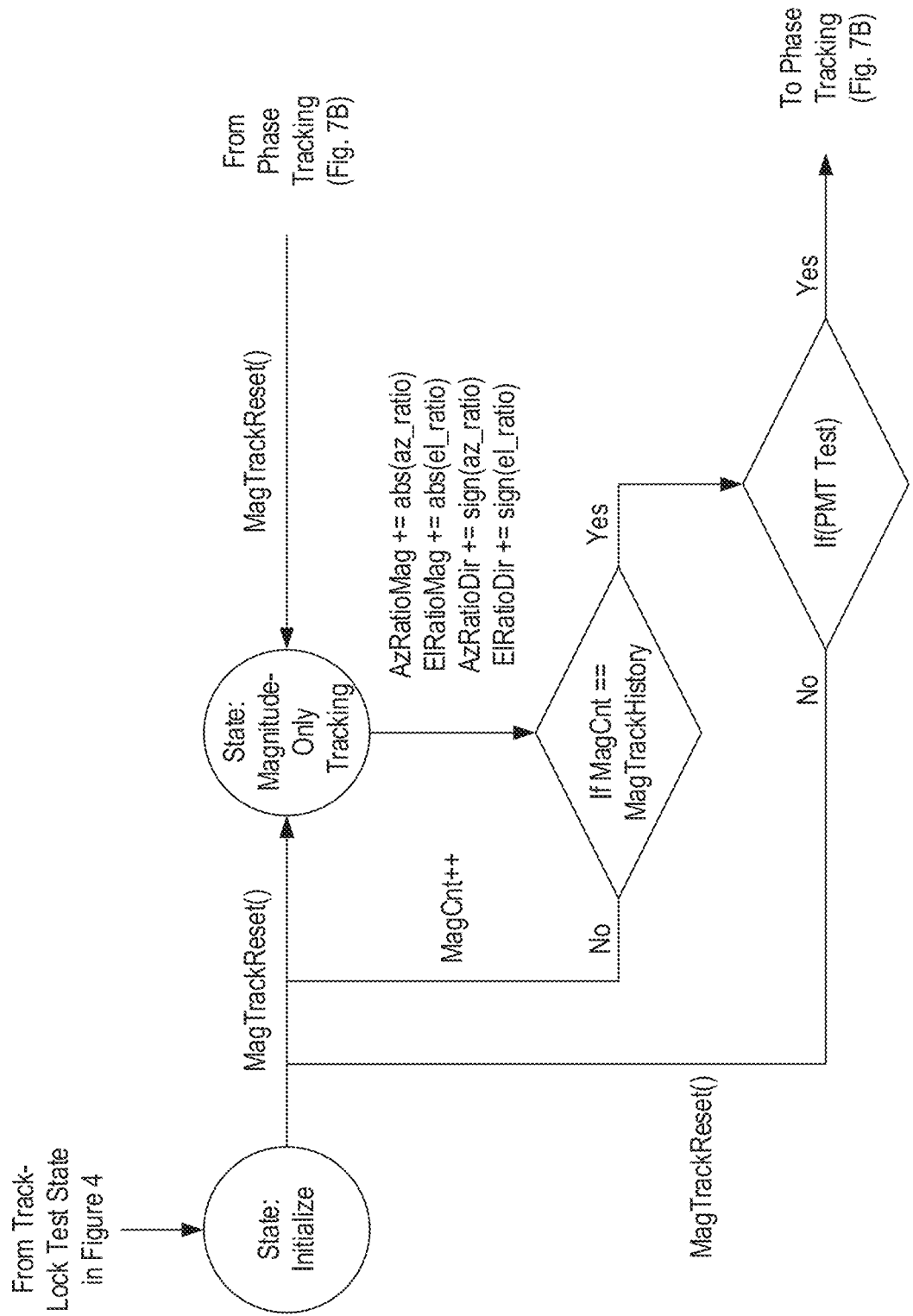
FIGS. 7A-7B illustrate a state diagram of a hybrid tracking process.
Figure 7B:
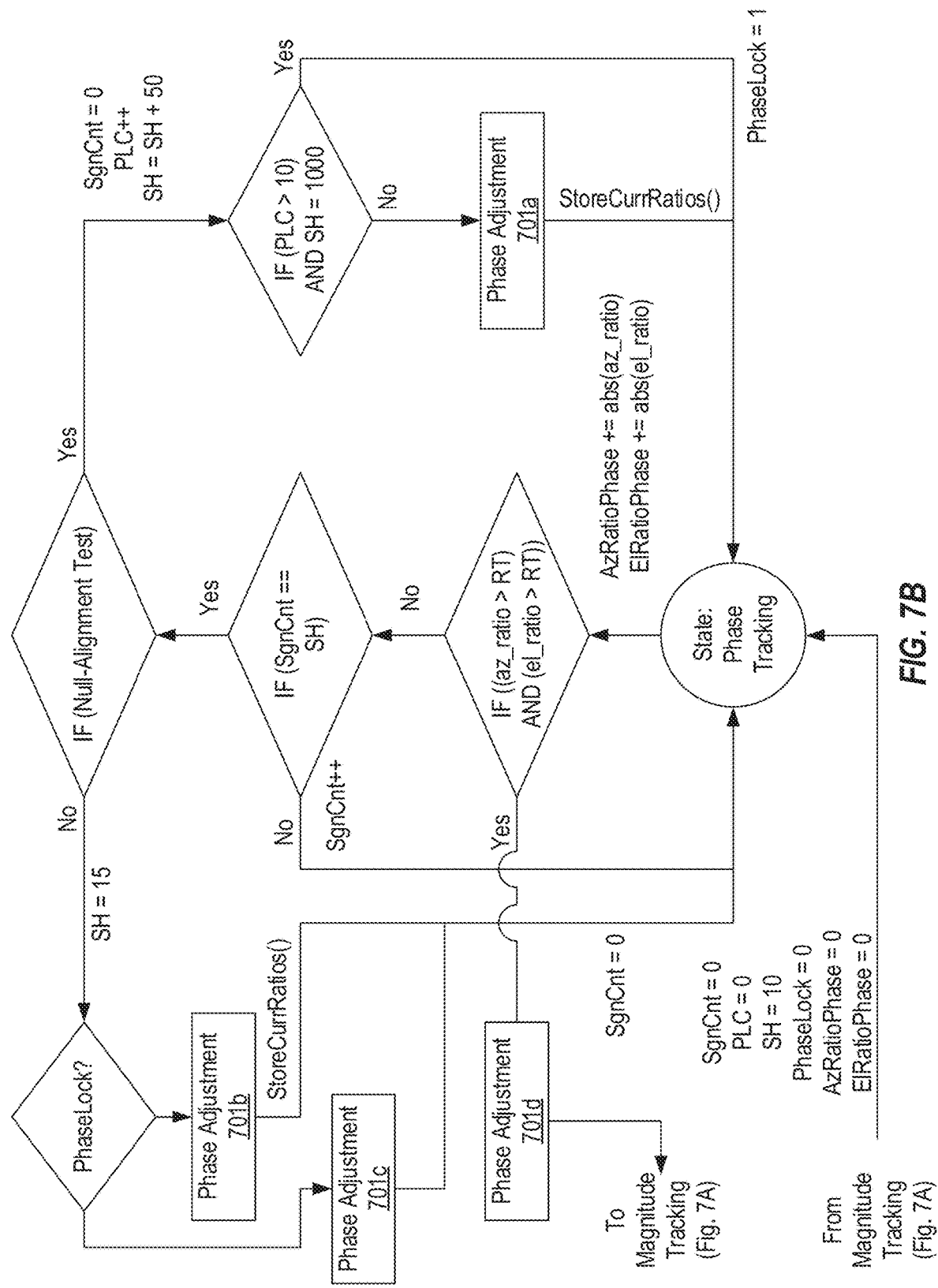

FIGS. 7A and 7B provide a state diagram for hybrid mode tracking in accordance with embodiments of the present invention. FIG. 7A illustrates the portion of the state diagram representing magnitude-only tracking, while FIG. 7B illustrates the portion of the state diagram representing phase tracking. This state diagram can represent the process that is performed in the Tracking state shown in FIG. 4. As indicated above, in hybrid mode tracking, magnitude-only tracking can be performed to initially locate the nulls and then phase tracking can perform phase correction if needed.

Turning to FIG. 4, when the track-lock test passes, MDA 203 will commence tracking in the tracking state. When hybrid-mode tracking is enabled, as shown in FIG. 7A, this can include transitioning from the track-lock test state to an initialize state in which a number of tracking parameters are initialized (as represented by MagTrackReset( )). These tracking parameters include a MagCnt parameter which tracks the number of magnitude tracking iterations that have been performed, an AzRatioMag parameter which stores a value representing the sum of the absolute value of the magnitudes of the azimuth ratio within the MagCnt period, an ElRatioMag parameter which stores a corresponding elevation value representing the sum of the absolute value of the magnitudes of the elevation ratios within the MagCnt period, an AzRatioDir parameter which stores a value representing a sum of the signs of the azimuth ratio, and an ElRatioDir parameter which stores a value representing a sum of the signs of the elevation ratio. Each of these parameters can be initialized to zero (e.g., by calling MagTrackReset( )) as part of transitioning into the magnitude-only tracking state.

As mentioned above, magnitude-only tracking entails calculating the magnitude of current values of the azimuth ratio (az_ratio) and the elevation ratio (el_ratio) and then steering monopulse antenna 201 to minimize the ratio. At each iteration of this steering (i.e., each time MDA 203 causes the boresight angle of monopulse antenna 201 to be changed), the absolute values of the azimuth and elevation ratios can be added to the AzRatioMag and ElRatioMag parameters respectively. Therefore, at any given time, each of these two parameters will store a sum of the magnitudes of the corresponding ratios that have been calculated during the previous iterations of magnitude tracking. The purpose of this summation is to eventually compute an average ratio magnitude value that can be used for future comparison. Also, at each iteration of this steering, the AzRatioDir and ElRatioDir parameters can be updated by adding 1 or −1 to the value of the parameter based on the sign of the current azimuth or elevation ratio respectively. In particular, when the corresponding ratio has a positive value (e.g. when the target is to the right of or above the boresight angle), the parameter can be incremented by 1, whereas when the corresponding ratio has a negative value (e.g., when the target is to the left of or below the boresight angle), the parameter can be decremented by 1. In theory, for a perfect tracking system, the result of this calculation when tracking perfectly at the null would average out to 0. At each iteration, a value of the MagCnt parameter can also be incremented by 1.

This loop can be repeated until a specified number of iterations have been performed. For example, the MagTrackHistory parameter can be set to a desired value (e.g., 250). Then, once the MagCnt parameter reaches the value of the MagTrackHistory parameter, the phase mode transition (PMT) test can be performed to determine whether the process should transition into phase tracking. Assuming the value of the MagTrackHistory parameter is 250, 250 iterations of magnitude tracking will be performed prior to performing the PMT test. In this case, both the AzRatioMag and ElRatioMag parameters would equal the sum of the magnitudes of the 250 previous azimuth and elevation ratios, respectively. At this point, they will each be divided by MagCnt to obtain the average ratio value for the azimuth and elevation channels. These parameters can be employed later during phase tracking as will be described below.

The PMT test can be employed to determine whether monopulse antenna 201 has been steered sufficiently towards the azimuth and elevation nulls. For example, in some embodiments, the PMT test can determine whether the absolute values of both the AzRatioDir and ElRatioDir parameters are below a defined threshold (e.g., IF ((Abs(AzRatioDir)<Threshold) and (Abs(ElRatioDir)<Threshold)). For example, when the MagTrackHistory parameter is set to 250, the Threshold used in the PMT test can be 125. This Threshold can be a configurable parameter to allow monopulse antenna system 200 to be configured for a specific environment or for a specific target. For example, faster moving targets may require a larger threshold.

If the null has been found, MDA 203 would typically cause monopulse antenna 201 to dither about this null such that the sign of the azimuth and elevation ratios (using the magnitude-only mode tracking definition of a sign-change) will periodically switch back and forth. Therefore, when the null has been found, the values of the AzRatioDir and ElRatioDir should be minimized and the PMT test will pass causing phase tracking to be commenced. In contrast, if the PMT test fails, the process can be repeated by resetting the values of each of the parameters (e.g., by calling MagTrackReset( ) to set MagCnt, AzRatioMag, ElRatioMag, AzRatioDir, and ElRatioDir equal to 0) and returning to the magnitude tracking state as shown in FIG. 7A.

As an example of magnitude-only tracking, if the target is initially to the right of the boresight angle, the azimuth ratio will have a magnitude value of Y. In this scenario, and having known the previous direction, MDA 203 will steer monopulse antenna 201 slightly to the right, reducing the azimuth ratio eventually to a magnitude of Z, which represents the minimum azimuth ratio magnitude achieved by the azimuth difference channel null. This process will be repeated until the azimuth ratio magnitude becomes greater than Z (i.e., once the target is to the left of the boresight angle). Therefore, as monopulse antenna 201 is steered towards the null, the value of AzRatioDir will be positive for a number of iterations. If the azimuth ratio is positive for 250 consecutive iterations (meaning that the null has yet to be reached), the value of the AzRatioDir parameter will be 250 therefore causing The PMT test to fail and magnitude tracking to be continued for 250 more iterations. In contrast, if the azimuth ratio is positive for 100 consecutive iterations (which would result in the AzRatioDir parameter reaching a value of 100) and then commences switching back and forth between increasingly larger magnitudes, the AzRatioDir would remain close to 100 (or less) such that The PMT test would pass. In this way, the AzRatioDir and ElRatioDir parameters can be used to determine when the nulls have been found during magnitude-only mode and therefore that phase tracking can be commenced.

Turning now to FIG. 7B, upon transitioning to phase tracking, a number of parameters can be initialized for use in the phase tracking process. These parameters include a SgnCnt parameter which tracks the number of phase tracking iterations that have been performed, a phase lock counter (PLC) parameter that is used to determine when phase lock has occurred, a sign history (SH) parameter which is used to define how many iterations of phase tracking will be performed before a phase error calculation will be performed, a PhaseLock parameter which defines whether phase lock has occurred, an AzRatioPhase parameter which stores a value representing the sum of the absolute value of the magnitudes of the azimuth ratios within a SgnCnt period, and an ElRatioPhase parameter which stores a value representing the sum of the absolute value of the magnitudes of the elevation ratios within a SgnCnt period. In this example, it is assumed that the SH parameter is initially set to 10 while the other parameters are initially reset to 0.

As compared to the magnitude-only tracking method described above, during traditional phase tracking, MDA 203 will steer monopulse antenna 201 based on the current phases (or signs) of the azimuth and elevation ratios. Assuming there is no phase error, the phase response of the difference channel signals should be zero at the nulls, and therefore, MDA 203 will steer monopulse antenna 201 to attempt to remain near these phase zero crossings. This can be accomplished by steering the monopulse antenna by an azimuth step and an elevation step at each iteration. The direction of each step will be based on the sign of the corresponding azimuth and elevation tracking ratios. Therefore, MDA 203 will cause monopulse antenna 201 to dither about the phase zero crossings (i.e., it would repeatedly steer the antenna in stepped increments in one direction until the sign changes and then return in stepped increments in the opposite direction). However, if there is a phase error, the phase zero crossings will not align with the nulls which would result in this dithering occurring away from the nulls, or, if the phase error is significant, in the eventual failure of the mainlobe-check test and the return to open loop scanning.

To account for these phase error scenarios, the phase error correction process depicted in FIG. 7B can be implemented. Prior to describing the phase error correction process, it is to be understood that the phase error that is to be corrected exists in the signal received at the individual antenna elements as opposed to phase drift that may occur on each individual channel as the received signals are processed within monopulse antenna system 200, or even the sum-to-difference channel phase alignment to compute the difference channel ratio. The phase drift that can occur on each individual channel may be due to different phase errors that are introduced on a component-by-component basis during the independent processing of the channels (e.g., an LNA used to produce the sum channel may introduce a different phase error than an LNA used to produce the azimuth difference channel). Such phase drift is also exacerbated over frequency and temperature. This phase error can be overcome by some amount of hardware unit calibration and is not discussed in this patent. Furthermore, phase alignment is essential to computing azimuth and elevation tracking ratios. The crucial phase alignment in this case is the sum channel signal phase relative to the difference channel signal phase. Techniques exist for accounting for this type of phase alignment when digitally combining the sum and difference channels (see e.g., U.S. patent application Ser. No. 14/572,470) but such techniques are not the subject of the present invention. However, the phase error correction process of the present invention can be used in conjunction with such phase drift calibration or sum-to-difference channel phase alignment/correction techniques. In short, the present invention can allow phase tracking to be employed even when the signals received at the individual antenna elements are not phase aligned with the down-stream RF and digital processing.

Figure 8:
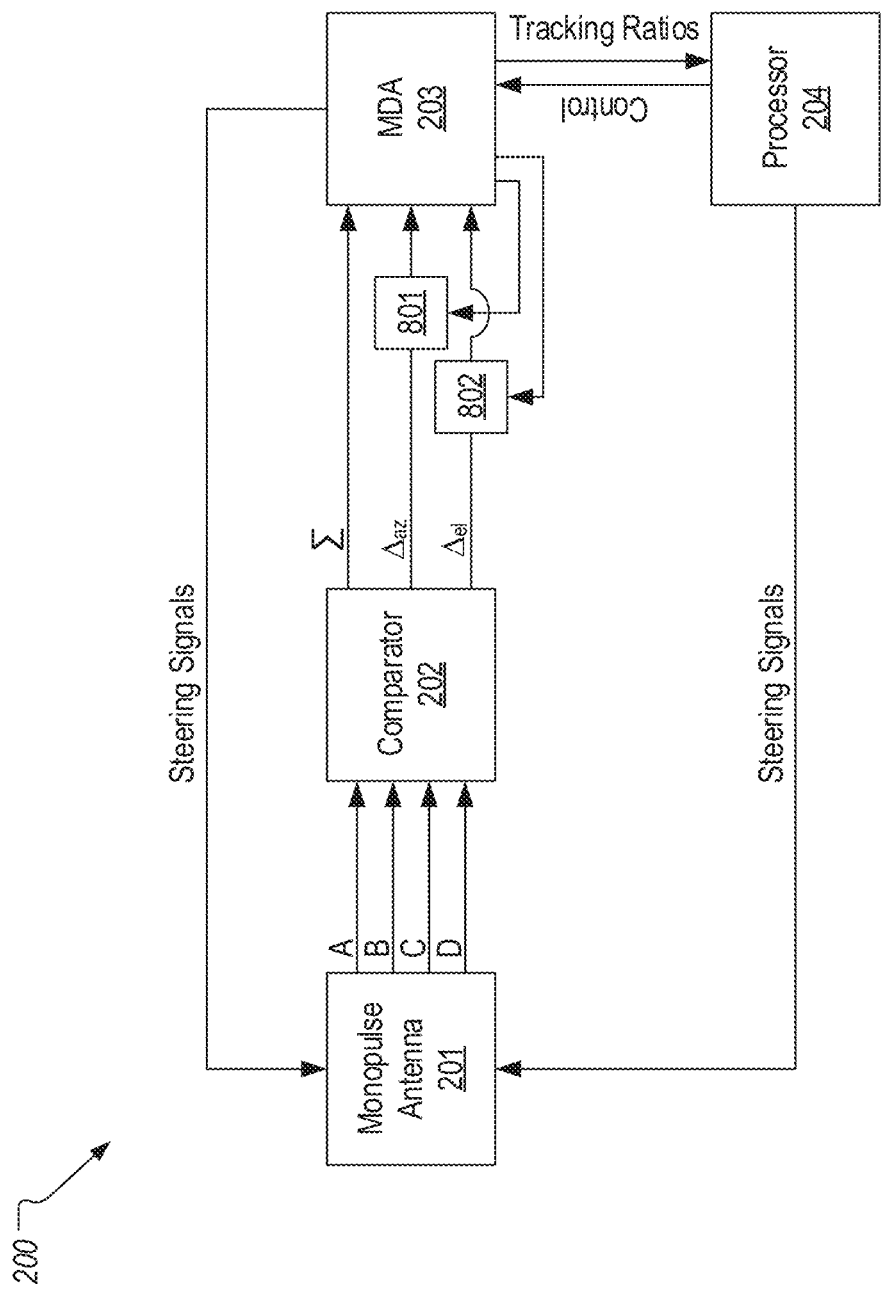
FIG. 8 illustrates a block diagram of a monopulse antenna system that is configured to implement the hybrid tracking process in accordance with one or more embodiments of the present invention.

To enable phase errors to be corrected, monopulse antenna system 200 can include a phase shifter 801 and 802 in the azimuth difference channel and elevation difference channel respectively as shown in FIG. 8. Phase shifters 801 and 802 can preferably be implemented on an FPGA that forms part of MDA 203. Therefore, even though for illustrative purposes FIG. 8 depicts phase shifters 801 and 802 as separate from MDA 203 (which is one possible way in which the phase shifters 801 and 802 could be implemented), for speed and efficiency reasons, FPGA-implemented phase shifters may typically be employed. The process depicted in FIG. 7B will calculate a phase shift that should be applied by each of phase shifters 801, 802 to account for a phase error. MDA 203 can calculate the required phase shift in a systematic method until the current phase shift corrects for all measured phase error. MDA 203 can perform this process independently for each difference channel as will now be described in detail.

As shown in FIG. 7B, after the conditions of the PMT test are met, MDA 203 will transition into phase tracking. As part of this transition, the SH parameter can be set to an initial value (e.g., 10) while the PLC, PhaseLock, AzRatioPhase, and ElRatioPhase parameters can be set to 0. As indicated above, during phase tracking, MDA 203 will steer monopulse antenna 201 in azimuth and elevation steps based on the phase (or sign) of the current azimuth and elevation ratios. Initially, it can be assumed that no phase error exists (i.e., that the phase zero crossings align with the nulls in the ratios) and therefore that phase shifters 801, 802 are configured to apply no phase shift (i.e., a 0° shift) to the corresponding difference channel.

As shown, at each iteration of phase tracking, MDA 203 can add the absolute value of the azimuth and elevation ratios to the AzRatioPhase and ElRatioPhase parameters respectively. Also, at each iteration, MDA 203 will compare the current magnitude of the azimuth and elevation ratios to a Radius Threshold (RT) parameter. The RT parameter can be a configurable parameter that controls when MDA 203 will return to magnitude-only tracking. For example, RT can be set to 0.25 (assuming the ratios during magnitude-only tracking were lower than this amount) such that, whenever either the azimuth or elevation ratio exceeds 0.25 (which would indicate that monopulse antenna 201 is at potential risk for failing the mainlobe-check test), MDA 203 will resume magnitude-only tracking to return to tracking near the difference channel nulls.

As long as the azimuth and elevation ratios remain below RT, MDA 203 will continue to sum the magnitudes of the ratios until SgnCnt (which is incremented with each iteration) equals SH. As mentioned above, SH can initially be set to 10 such that 10 iterations will initially be performed. After these 10 iterations, the null-alignment test (NAT) will be evaluated based on the average values of the AzRatioPhase and ElRatioPhase parameters (based on SgnCnt iterations) and the stored values of the AzRatioMag and ElRatioMag parameters. In other words, MDA 203 can compare the magnitudes of the ratios during phase tracking to the magnitudes of the ratios during the previous magnitude tracking to determine whether the current magnitudes have increased beyond a threshold.

For example, the NAT can be: IF AzRatioPhase/SH<(AzRatioMag/MTH) and IF ElRatioPhase/SH<(ElRatioMag/MTH). The NAT can therefore determine whether the average magnitude of the ratios during SH iterations of phase tracking is less than the average magnitude of the ratios during the MTH iterations of magnitude tracking that were performed prior to commencing phase tracking. In some embodiments, the average magnitude of the magnitude-only mode ratios can be scaled by a factor of X (e.g., IF AzRatioPhase/SH<(AzRatioMag/MTH)*X and IF ElRatioPhase/SH<(ElRatioMag/MTH)*X). As an example, X can be set to 1.25. The primary purpose of the NAT is to determine whether phase tracking has kept monopulse antenna 201 oriented towards the nulls. Since the average ratios from magnitude-only tracking should represent the average ratios at the nulls, the NAT will identify whether phase tracking caused monopulse antenna 201 to be steered away from the nulls. Scaling by X can prevent the NAT from failing when there are only slight differences between the average magnitude and phase ratios.

If the NAT passes, it is assumed that monopulse antenna 201 is still near the nulls and a determination of whether a phase lock has already been established can be performed. In contrast, if the NAT fails, it is assumed that monopulse antenna 201 has been steered away from the null(s) due to the phase zero crossing(s) not aligning with the null(s). If the NAT fails, a phase correction can be calculated and applied to the appropriate difference channels. It is noted that a phase error may exist only in one ratio. Therefore, MDA 203 can perform the phase error correction process independently on each ratio. In particular, the NAT may be performed independently on each ratio leading to an independent calculation of a phase correction for each difference channel. However, for ease of illustration, it will be assumed that a similar phase error exists in both difference channels such that the phase error correction process will proceed in sync for both ratios.

Assuming the NAT passes for both ratios, MDA 203 will proceed to determine whether a phase lock has been established. Each time the NAT passes, PLC can be incremented by 1 and SH can be incremented by 50 (or some other reasonable value) unless SH has already reached 1000 (or some other reasonable value) in which case SH will remain at 1000. Then, a phase lock determination can be made. In this case, if PLC is greater than 10 and SH equals 1000, it can be determined that phase lock has occurred. Therefore, for phase lock to occur, the average magnitudes of the ratios must remain below the average magnitudes (or scaled average magnitudes) of the ratios that existed during magnitude-only tracking for a large number of iterations. This would be the case if phase tracking is keeping monopulse antenna 201 at the nulls. If phase lock has occurred, the PhaseLock parameter can be set to 1 and phase tracking can be continued without any adjustment to the current phase corrections (i.e., without updating phase shifters 801, 802).

In contrast, if phase lock has not yet occurred, updated phase corrections can be calculated at phase adjustment block 701a. The specific manner in which an updated phase correction can be calculated will be described below. Because the NAT has passed thereby implying that monopulse 201 is still at or near the nulls, a relatively small adjustment can be made to the phase corrections. In other words, it can be assumed that the current phase corrections are substantially offsetting any phase error that may exist but that it may be possible to improve the phase corrections. MDA 203 can therefore continue to make these slight phase adjustments in an attempt to completely offset any measurable phase error.

Also, the direction of this phase adjustment can be based on whether the magnitude of the corresponding ratio is increasing or decreasing. In other words, if the magnitude of AzRatioPhase (using azimuth as an example) computed at the SH interval is larger than the AzRatioPhase during the previous SH period, it can be assumed that the current phase correction does not perfectly align the phase zero crossing with the null and therefore the phase correction should be adjusted in a negative direction (i.e., leftward or downward with respect to the example orientation used above). In practice, phase adjustment block 701a will make repeated small adjustments to the phase correction in one direction until the phase correction causes the phase zero crossing to be positioned on the opposite side of the null (from the perspective of MDA 203). At this point, phase adjustment block 701a will make repeated adjustments in the other direction. Assuming monopulse antenna 201 remains in the nulls, this process will continue until phase lock is established.

Whenever the NAT fails, the process will flow to either phase adjustment block 701b if phase lock has been established (i.e., if the PhaseLock parameter is set to 1) or to phase adjustment block 701c if phase lock has not been established. In each of phase adjustment blocks 701b, 701c, updated phase corrections can be calculated. With regards to phase adjustment block 701b, because phase lock had been established, the adjustment to the phase correction can be small but slightly greater than the adjustment made in phase adjustment block 701a, whereas, with regard to phase adjustment block 701c, because phase lock has not been established, a relatively large adjustment can be made. Again, these adjustments to the phase corrections can be made to attempt to more accurately offset the actual phase error. The primary role of the phase error correction process therefore is to repeatedly increment the phase corrections until the measurable phase error is minimized. Whenever the NAT fails, SH can be set to 15 (or some other reasonable value) and SgnCnt can be reset to cause 15 iterations to be performed prior to again evaluating the NAT.

Finally, if either of the ratios exceeds RT, MDA 203 can transition back to magnitude-only tracking including calculating new phase corrections at phase adjustment block 701d. In this case, it can be assumed that the current phase corrections are not accurate and should be substantially updated. Therefore, phase adjustment block 701d can apply a large (e.g., 90°) adjustment to the phase corrections prior to resuming magnitude tracking. The adjustments made by phase adjustment block 701d will remain during magnitude-only tracking and until a subsequent adjustment is made once phase tracking is again resumed. Once phase tracking is resumed, the same process will be performed to again locate a phase correction that will offset the phase error.

Figure 9A:
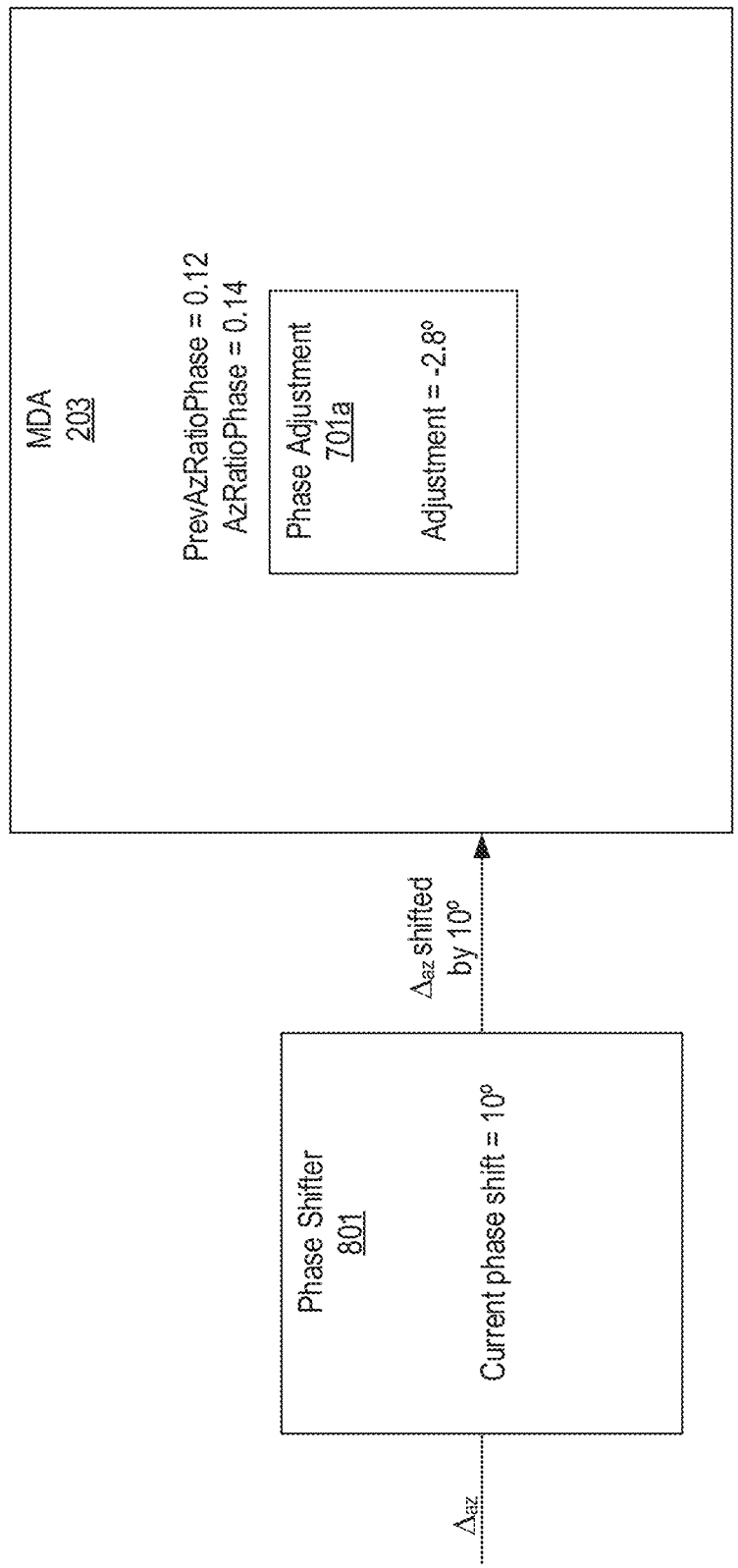
FIGS. 9A and 9B illustrate an example of how a phase shifter can be updated to apply a different phase correction during the hybrid tracking process.
Figure 9B:
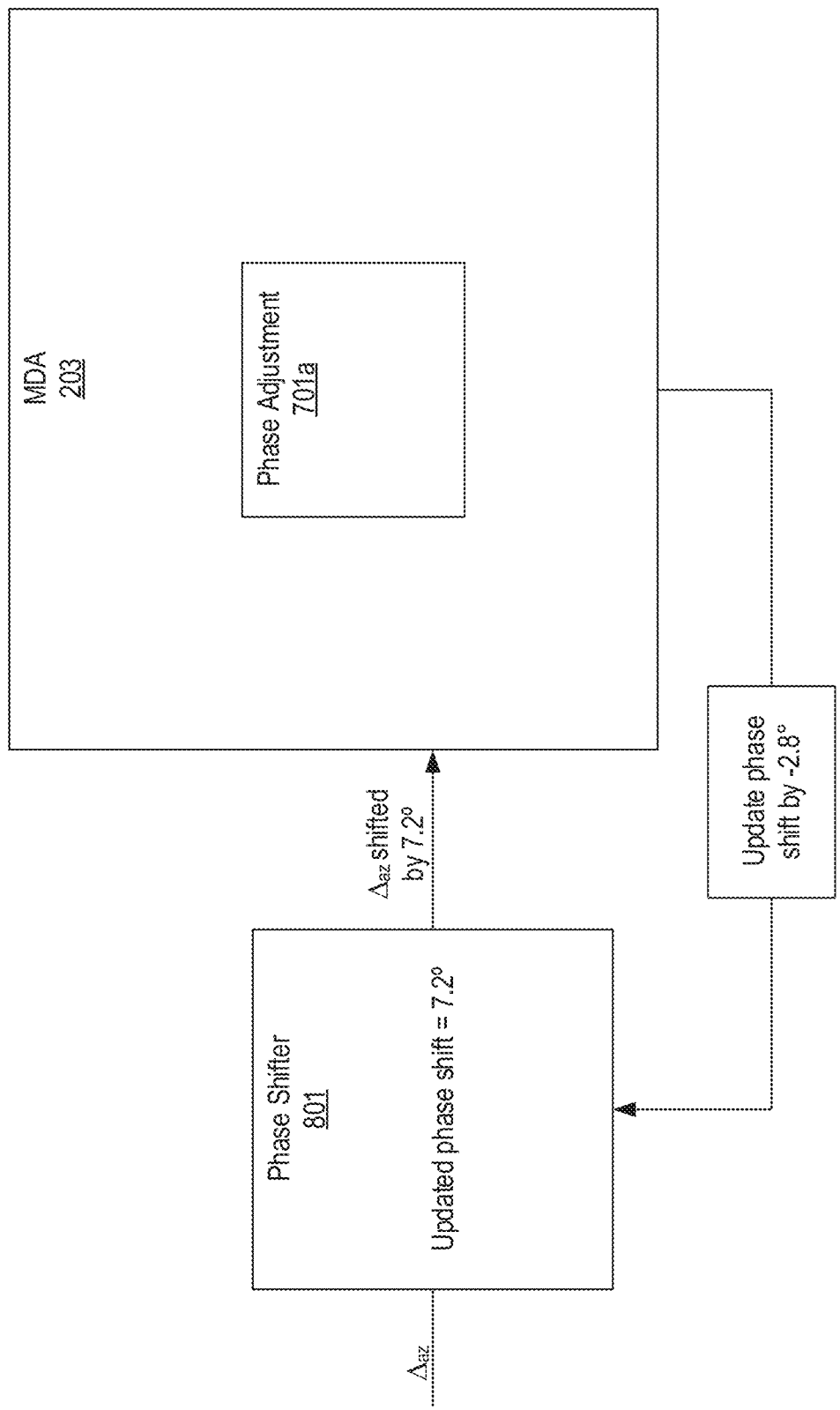

If the phase error correction process reaches phase adjustment blocks 701a or 701b, it can be assumed that the current phase corrections are relatively accurate. Therefore, phase adjustment blocks 701a, 701b can be configured to make small adjustments to the phase corrections. FIGS. 9A and 9B generally illustrate how this can be done for the azimuth difference channel. In FIG. 9A, it is assumed that phase shifter 801 is currently configured to apply a phase shift of 10° to the azimuth difference channel. While this 10° phase shift is being applied, MDA 203 can perform the phase error correction process including calculating the magnitude of the azimuth ratio at each steering iteration. As represented by StoreCurrRatios( ) in FIG. 7B, MDA 203 can be configured to retain the values of the previous AzRatioPhase and ElRatioPhase computed during the previous SH loop period (e.g., as values of PrevAzRatioPhase and PrevElRatioPhase parameters) to allow MDA 203 to determine whether the ratios are increasing or decreasing in subsequent periods. In other words, the phase corrections calculated in phase adjustments blocks 701a and 701b are based on a comparison of the current ratio average to the corresponding previous ratio average. In this example, it will be assumed that the current AzRatioPhase (computed after reaching SH SgnCnt iterations) averages to a magnitude of 0.14, but the prevAzRatioPhase magnitude during the previous SH period had an average of 0.12, thereby indicating that monopulse antenna 201 is currently being steered away from the azimuth null. Therefore, the computed phase adjustment block 701a can determine that the phase correction being applied by phase shifter 801 should be reduced.

Assuming that phase adjustment block 701a is configured to make approximately a 2.8° adjustment (represented by 8 steps of a 10-bit digital phase-shifter), MDA 203 can apply this adjustment as −2.8° to the current phase shift (i.e., 8 steps or $$\left(\frac{\pi}{64}\right)$$

*NewDirection, where NewDirection is + when the ratio is decreasing and − when the ratio is increasing). Accordingly, FIG. 9B shows the result of the example described in FIG. 9A, where MDA 203 outputs a signal to phase shifter 801 causing phase shifter 801 to apply a phase shift of 7.2°. A similar calculation, but with a different phase step size will be performed by phase adjustment block 701b. For example, phase adjustment block 701b could be configured to apply an 11.25° adjustment to the current phase correction where this adjustment will be added to or subtracted from the current phase correction depending on whether the azimuth ratio is decreasing or increasing respectively (i.e., 32 steps or $$\left(\frac{\pi}{16}\right)$$

*NewDirection). This calculation of the adjustment to the phase correction can be performed independently for each of the azimuth and elevation ratios so that a proper adjustment can be supplied to each of phase shifters 801, 802. In short, phase adjustment blocks 701a, 701b can both be configured to apply a fixed adjustment to the current phase shift in a direction that is dependent on whether the corresponding ratio is increasing or decreasing.

Phase adjustment blocks 701c, 701d can be configured to calculate an adjustment in a slightly different manner. Rather than employing previous ratio magnitude averages to determine whether a ratio is increasing or decreasing, each of phase adjustment blocks 701c, 701d can employ the sin( ) of the current ratio to determine the direction of the adjustment as well as to scale the amount of the adjustment. For example, phase adjustment block 701c can calculate the adjustment as 64 steps of a 10-bit digital phase shifter $$\left(\frac{\pi}{8}\right)$$

*sin(ratio) and phase adjustment block 701d can calculate the adjustment as 256 steps of a 10-bit phase shifter $$\left(\frac{\pi}{2}\right)$$

*sin(ratio).

In summary, phase adjustment blocks 701a-701c can each be configured to calculate an adjustment to the phase corrections that are currently being applied by phase shifters 801, 802 in an attempt to offset any phase error that may exist during subsequent phase tracking. In contrast, phase adjustment block 701d can apply a large adjustment to the phase corrections prior to transitioning back to magnitude tracking since these current phase corrections will have caused phase tracking to incorrectly steer monopulse antenna 201 away from the nulls.

When a phase error exists, phase tracking will initially steer monopulse antenna 201 away from the null. As this steering is occurring, MDA 203 will detect that the ratios are increasing when the NAT fails and can then adjust the phase correction being applied by phase shifter 801 and/or 802. These repeated adjustments to the phase correction should ultimately offset the phase error thereby aligning the phase zero crossings with the nulls. Once this alignment occurs, phase lock will be established and the NAT will be applied on a less frequent interval. Absent any significant change to the phase error, this phase lock will be retained thereby allowing MDA 203 to perform phase tracking throughout the tracking process. In other words, once phase lock is obtained, no more phase corrections are required unless there is some tracking event that causes the tracking to revert back to magnitude-only tracking mode.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for detecting the mainlobe in a monopulse antenna system and then tracking on the mainlobe, the method comprising:
    during open loop scanning, performing an initial power-level test to identify when a lobe has been located, wherein the initial power-level test comprises determining whether a sum channel power exceeds one or both of an azimuth difference channel power and an elevation difference channel power;
    in response to the initial power-level test passing, commencing closed loop scanning;
    during closed loop scanning, performing a track-lock test to identify when the mainlobe has been located; and
    in response to the track-lock test passing, commencing hybrid tracking in which magnitude-only tracking is initially performed and then phase tracking is performed.

2. The method of claim 1, wherein the initial power-level test further comprises determining whether one or both of an azimuth ratio and an elevation ratio are below an initial power-level threshold.

3. The method of claim 1, wherein the initial power-level test passes when a sum channel power exceeds an azimuth difference channel power and an elevation difference channel power and when an azimuth ratio and an elevation ratio are both below an initial power-level threshold.

4. The method of claim 1, wherein the initial power-level test is iteratively performed during the open loop scanning.

5. The method of claim 1, wherein commencing closed loop scanning comprises commencing steering a monopulse antenna of the monopulse antenna system based on an RF signal received by the monopulse antenna.

6. The method of claim 1, wherein the track-lock test comprises determining whether a sum channel power exceeds one or both of an azimuth difference channel power and an elevation difference channel power.

7. The method of claim 6, wherein the track-lock test further comprises determining whether one or both of an azimuth ratio and an elevation ratio are below a track-lock threshold.

8. The method of claim 1, wherein the track-lock test passes when a sum channel power exceeds an azimuth difference channel power and an elevation difference channel power and when an azimuth ratio and an elevation ratio are both below a track-lock threshold.

9. The method of claim 1, wherein the track-lock test is iteratively performed during the closed loop scanning.

10. The method of claim 1, further comprising:
    during the closed loop scanning, determining that the track-lock test has not passed after a timeout period has elapsed; and
    in response to determining that the track-lock test has not passed after the timeout period has elapsed, returning to the open loop scanning.

11. The method of claim 1, further comprising:
    during the magnitude-only tracking, determining that a mainlobe check test has failed; and
    in response to determining that the mainlobe check test has failed, returning to the open loop scanning.

12. The method of claim 11, wherein the mainlobe check test comprises determining whether a sum channel power exceeds an azimuth difference channel power and an elevation difference channel power.

13. The method of claim 1, wherein hybrid tracking comprises:
    commencing magnitude-only tracking;
    during magnitude-only tracking, storing a first azimuth magnitude parameter that represents a magnitude of the azimuth ratio over a number of magnitude steering iterations and a first elevation magnitude parameter that represents a magnitude of the elevation ratio over the number of magnitude steering iterations, and also storing an azimuth direction indicator that represents a phase of the azimuth ratio over the number of magnitude steering iterations and an elevation direction indicator that represents a phase of the elevation ratio over the number of magnitude steering iterations;
    after magnitude-only tracking has been performed for the number of magnitude steering iterations, comparing the azimuth phase parameter and the elevation phase parameter to a defined threshold; and
    upon determining that the azimuth direction indicator and the elevation direction indicator are below the defined threshold, commencing phase tracking.

14. The method of claim 13, wherein hybrid tracking further comprises:
    during phase tracking, storing a second azimuth magnitude parameter that represents a magnitude of the azimuth ratio over a number of phase steering iterations and a second elevation magnitude parameter that represents a magnitude of the elevation ratio over the number of phase steering iterations; and
    after phase tracking has been performed for the number of phase steering iterations, determining whether the second azimuth magnitude parameter is less than the first azimuth magnitude parameter and determining whether the second elevation magnitude parameter is less than the first elevation magnitude parameter.

15. A monopulse antenna system comprising:
a monopulse antenna;
a comparator network that generates a sum channel, an azimuth difference channel and an elevation difference channel for a signal received at the monopulse antenna; and
a monopulse detector assembly that receives the sum channel, the azimuth difference channel and the elevation difference channel from the comparator network, wherein the monopulse detector assembly is configured to detect a mainlobe by performing the following:
during open loop scanning, performing an initial power-level test, wherein the initial power-level test comprises determining whether a sum channel power exceeds one or both of an azimuth difference channel power and an elevation difference channel power;
when the initial power-level test passes, transitioning to closed loop scanning;
during the closed loop scanning, performing a track-lock test; and
when the track-lock test passes, commencing tracking.

16. The monopulse antenna system of claim 15, wherein the monopulse detector assembly performs the initial power-level test by determining whether the sum channel power exceeds the azimuth difference channel power and the elevation difference channel power and whether an azimuth ratio and an elevation ratio are both below an initial power-level threshold.

17. The monopulse antenna system of claim 16, wherein the monopulse detector assembly performs the track-lock test by determining whether the sum channel power exceeds the azimuth difference channel power and the elevation difference channel power and determining whether the azimuth ratio and the elevation ratio are both below a track-lock threshold, the track-lock threshold being lower than the initial power-level threshold.

18. The monopulse antenna system of claim 17, wherein the monopulse detector assembly commences tracking by first performing magnitude-only tracking and then performing phase tracking.

19. A method for detecting a mainlobe in a monopulse antenna system, the method comprising:
during open loop scanning, performing an initial power-level test to identify when a lobe has been located, the initial power-level test comprising determining whether a sum channel power exceeds an azimuth difference channel power and an elevation difference channel power and whether an azimuth ratio and an elevation ratio are both below an initial power-level threshold;
in response to the initial power-level test passing, commencing closed loop scanning;
during closed loop scanning, performing a track-lock test to identify when the mainlobe has been located, the track-lock test comprising determining whether the sum channel power exceeds the azimuth difference channel power and the elevation difference channel power and determining whether the azimuth ratio and the elevation ratio are both below a track-lock threshold, the track-lock threshold being lower than the initial power-level threshold; and
in response to the track-lock test passing, commencing tracking.

\* \* \* \* \*